US008579167B2

(12) United States Patent
Yamada et al.

(10) Patent No.: US 8,579,167 B2
(45) Date of Patent: Nov. 12, 2013

(54) VEHICLE BODY REAR PART STRUCTURE

(75) Inventors: Eiji Yamada, Wako (JP); Kengo Ishibashi, Wako (JP); Takayuki Takahashi, Wako (JP); Hiroshi Ohkubo, Wako (JP); Masayuki Ogawa, Wako (JP); Kunihiko Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 362 days.

(21) Appl. No.: 12/813,914

(22) Filed: Jun. 11, 2010

(65) Prior Publication Data

US 2010/0314422 A1 Dec. 16, 2010

(30) Foreign Application Priority Data

Jun. 12, 2009 (JP) ................................. 2009-141101
Jun. 12, 2009 (JP) ................................. 2009-141160
Jun. 12, 2009 (JP) ................................. 2009-141209

(51) Int. Cl.
| | |
|---|---|
| *B62D 43/00* | (2006.01) |
| *B60R 9/00* | (2006.01) |
| *A45F 3/00* | (2006.01) |
| *B65D 1/00* | (2006.01) |
| *B65D 35/56* | (2006.01) |
| *A47G 23/02* | (2006.01) |

(52) U.S. Cl.
USPC ............ 224/42.23; 224/42.12; 224/518; 224/42.2; 224/630; 414/463; 296/37.2; 296/37.3; 254/323; 248/153; 248/108

(58) Field of Classification Search
USPC ............... 224/42.23, 42.12, 518, 42.2, 42.24, 224/630; 414/463; 296/37.2, 37.3; 248/108
IPC .................................. B62D 43/00,43/02, 43/04
See application file for complete search history.

(56) References Cited

U.S. PATENT DOCUMENTS 3,366,295 A * 1/1968 Nygaard ....................... 224/319
3,485,399 A * 12/1969 Hebnes ......................... 414/466

(Continued)

FOREIGN PATENT DOCUMENTS

DE 4311037 * 3/1993 ................ B60R 9/00
JP 01-161886 11/1989

(Continued)

OTHER PUBLICATIONS 1968-79 Corvette Spare Tire Carrier (http://www.chicagocorvette.net/diagram_view.php?d=2210&rc=145).*

(Continued)

*Primary Examiner* — Nathan J Newhouse
*Assistant Examiner* — Derek Battisti
(74) *Attorney, Agent, or Firm* — Rankin, Hill & Clark LLP

(57) ABSTRACT

A vehicle body rear part structure in which a spare tire is stored underneath a rear floor via a spare tire carrier. The vehicle body rear part structure includes a frame part and a tire cover. An embedding groove is formed in an external surface of the tire cover. The frame part is embedded in the embedding groove. Left and right front connecting parts of the frame part are rotatably connected to left and right front support parts. A rear connecting part of the frame part is vertically movably connected to rear support part. Vertical movements of the rear connecting part via the rear support part causes a spare tire to be disposed in a tire storage position and a tire accessing position.

19 Claims, 20 Drawing Sheets

(56) References Cited

U.S. PATENT DOCUMENTS

| | | | |
|---|---|---|---|
| 3,642,296 A * | 2/1972 | Froumajou | 280/834 |
| 4,060,270 A * | 11/1977 | Croissant | 296/37.2 |
| 4,093,088 A * | 6/1978 | Hildebrandt et al. | 414/463 |
| 4,174,797 A * | 11/1979 | Yasue et al. | 224/42.21 |
| 4,428,513 A * | 1/1984 | Delmastro | 224/42.21 |
| 4,588,114 A * | 5/1986 | Lebaron et al. | 224/435 |
| 5,076,629 A * | 12/1991 | Peters et al. | 296/37.2 |
| 5,531,558 A * | 7/1996 | Ruescher | 414/463 |
| 5,848,822 A * | 12/1998 | Wu | 297/344.18 |
| 5,860,687 A * | 1/1999 | Corporon et al. | 296/37.2 |
| 5,893,494 A * | 4/1999 | Charton | 224/42.23 |
| 6,547,219 B2 * | 4/2003 | Dobmeier et al. | 254/323 |
| 6,974,291 B2 * | 12/2005 | Li | 411/437 |
| 7,481,342 B2 * | 1/2009 | Lee | 224/42.23 |
| 2005/0056667 A1 * | 3/2005 | McClure et al. | 224/42.2 |
| 2006/0091688 A1 * | 5/2006 | McGuckin et al. | 296/37.2 |

FOREIGN PATENT DOCUMENTS

| | | |
|---|---|---|
| JP | 09-156544 | 6/1997 |
| JP | 2006-341642 | 12/2006 |

OTHER PUBLICATIONS 1968-79 Corvette Spare Tire Cover, http://www.chicagocorvette.net/diagram__view.php?d=2210&rc=145.*

* cited by examiner

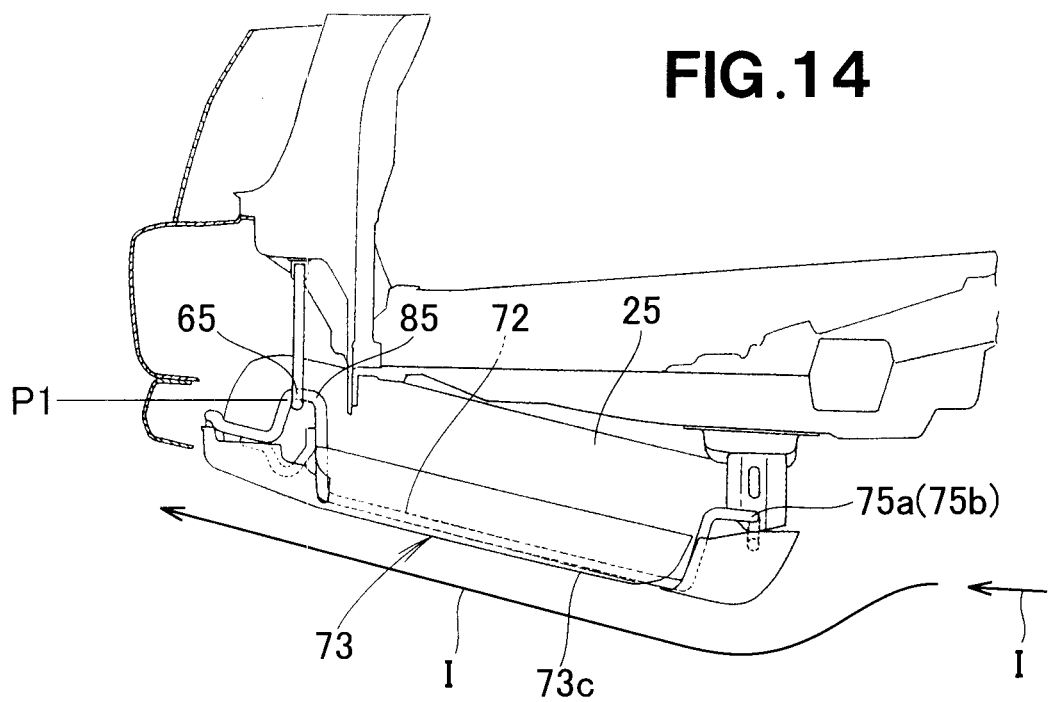

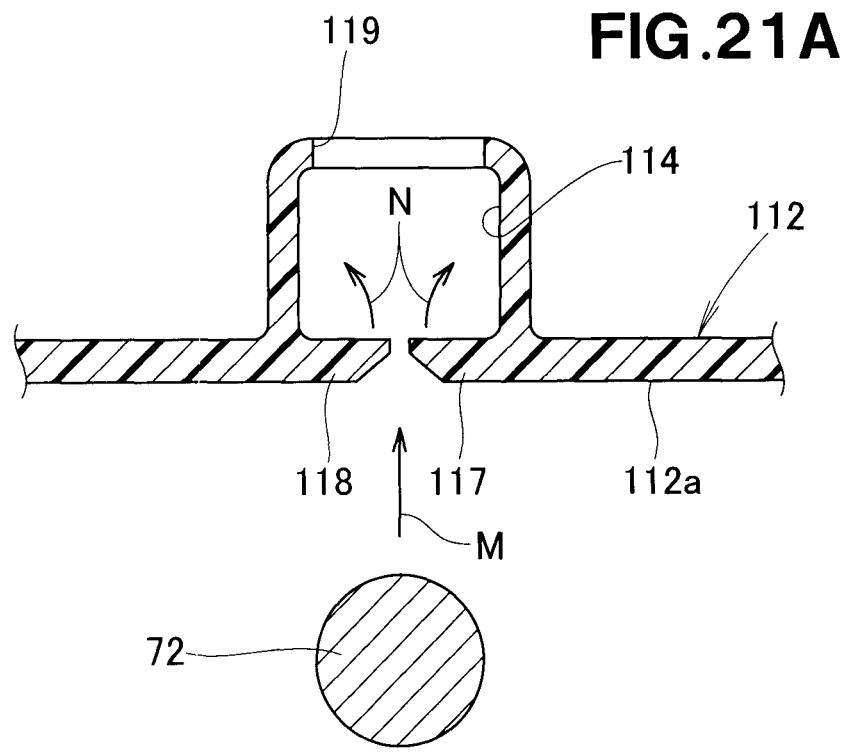
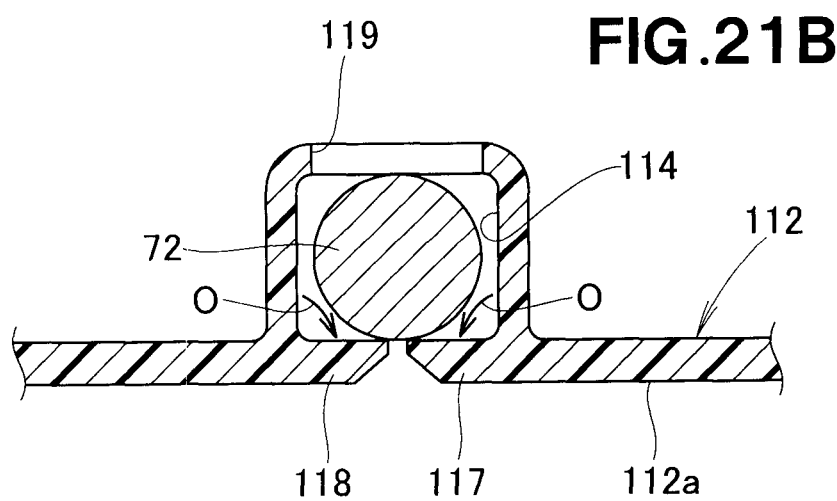

VEHICLE BODY REAR PART STRUCTURE

FIELD OF THE INVENTION

The present invention relates to a vehicle body rear part structure having a spare tire carrier which is comprised of a frame part, provided underneath a rear floor via front and rear support parts, for storing a spare tire.

BACKGROUND OF THE INVENTION

Storage structures for storing spare tires in the rear part of a vehicle body are known in the art, the structure disclosed in Japanese Patent Application Laid-Open Publication No. 2006-341642 (JP-A 2006-341642) being one example thereof.

The storage structure comprises an undercover located at a predetermined distance underneath a rear floor, and a tire storage space for storing a spare tire is formed by the rear floor and the undercover. An opening for accessing the spare tire is formed in the undercover. A winch is provided to the rear floor above the opening. The spare tire is suspended by a tire holder provided to the bottom end of a chain of the winch. The spare tire is stored in the tire storage space via the opening while in a state of being suspended by the chain and the tire holder. The bottom part of the tire holder is provided with a closing panel for closing off the opening.

Thus, according to the storage structure described above, the spare tire is held in the tire holder, and winding the chain of the winch raises the tire holder and closing panel. The closing panel rises and thereby closes the opening, whereby the spare tire is stored in the tire storage container.

The tire holder and the closing panel are lowered by unwinding the chain of the winch, and the spare tire in the tire storage space can be taken out from below the undercover (i.e. out of the vehicle) through the opening. Taking the spare tire out of the vehicle makes it possible to perform the task of replacing the spare tire.

However, to store and remove the spare tire in the spare tire storage structure disclosed in Japanese Laid-open Patent Publication No. 2006-341642, the winch must be wound and unwound, and the entire spare tire must be raised and lowered. Thus, when an attempt is made to raise or lower the entire spare tire, a large force is needed for the operation of winding or unwinding the chain, and the operations of storing and removing the spare tire are time-consuming.

SUMMARY OF THE INVENTION

It is therefore an object of the present invention to provide a vehicle body rear part structure whereby a spare tire can be easily replaced in a vehicle body without excessive effort.

According to an aspect of the present invention, there is provided a rear part structure of a vehicle body, which comprises a spare tire carrier which is comprised of a steel frame part, provided underneath a rear floor via front and rear support parts, for storing a spare tire; and a tire cover, provided on the frame part, for covering a bottom part of the spare tire, wherein the tire cover has on an external surface an embedding groove recessed toward inside the tire cover, the frame part being embedded in the embedding groove from outside the tire cover to thereby provide the tire cover to the frame part, and the frame part has front connecting parts rotatably connected to the front support parts, and a rear connecting part vertically movably connected to the rear support part, so that vertical movements of the rear connecting part via the rear support part place the spare tire carrier in a tire storage position in which the spare tire is stored in position, and a tire access position in which the spare tire is capable of being accessed.

In the thus-arranged rear part structure, the front connecting parts of the frame part are rotatably connected to the front support parts, and the rear connecting part of the frame part is vertically movably connected to the rear support part. Raising and lowering the rear connecting part using the rear support part causes the spare tire carrier to be disposed in the tire storage position and the tire accessing position. Consequently, the spare tire can be replaced merely by raising and lowering only the rear connecting part of the frame part. The operating force needed to replace the spare tire can thereby be minimized, and the spare tire can be easily replaced without excessive effort.

Furthermore, the bottom part of the spare tire is covered by the tire cover, whereby the bottom part of the spare tire can be concealed by the tire cover. Consequently, the bottom part of the spare tire can be lowered below the rear bumper so that the bottom part of the spare tire is not visible from outside the vehicle (i.e., a favorable outward appearance is ensured). The rear floor can thereby be lowered downward in accordance with the spare tire, and a large space in the rear cabin of the vehicle can therefore be ensured.

In addition, the embedding groove is formed in the tire cover, and the frame part is embedded in the embedding groove. Consequently, the frame part can be prevented from protruding from the external surface of the tire cover, and the external surface of the tire cover can be kept substantially flat. Air currents can thereby flow smoothly along the external surface of the tire cover, aerodynamic performance can be improved, and fuel consumption performance can be improved.

Preferably, the tire cover comprises: a metallic bottom front cover part for covering a bottom front part of the spare tire; and a resinous bottom rear cover part, extending in a direction away from the bottom front cover part rearwardly of the vehicle body, for covering a region extending from behind a bottom front part to a bottom rear part of the spare tire. With this arrangement, when the bottom front part of the spare tire falls toward the road surface due to a shock load acting on the spare tire, the metal bottom front cover can come in contact with the road surface (the ground). The metal bottom front cover can thereby slide along the road surface toward the front of the vehicle body together with the vehicle. In other words, the bottom front part of the spare tire can be prevented from coming in contact with the road surface (the ground), the spare tire can be prevented from bouncing back toward the rear of the vehicle body, and situations in which the rear of the vehicle body (i.e. the rear floor) is affected by a bouncing spare tire can be prevented.

Desirably, the embedding groove is defined by opposed side walls, each side wall having an interlocking projections protruding toward an interlocking projections of a companion side wall, and the frame part is held in the embedding groove by the interlocking projections whereby the frame part is prevented from falling out. By having these interlocking projections elastically deform, the frame part can pass over the interlocking projections and be led into the embedding groove. The frame part can thereby be readily embedded in the embedding groove without excessive effort. Holding the frame part in the embedding groove using the interlocking projections also prevents the frame part from falling out. There is accordingly no need to prepare a holding-member in order to hold the frame part in the embedding groove, and the number of components can be minimized.

In a preferred form, the frame part comprises: front connecting parts rotatably connected to the front support parts; and an annular rear connecting part latched to a hook of the rear support part, the hook being vertically movably provided to the rear support part, so that vertical movements of the hook via the rear support part place the annular rear connecting part in the tire storage position in which the spare tire is stored in position, and a tire access position in which the spare tire is capable of being accessed. Due to the rear connecting part being formed in an annular shape in this manner, there is no risk of the annular rear connecting part detaching (separating) from the hook even if a shock load is exerted on the spare tire from the rear of the vehicle body. Consequently, the annular rear connecting part can be preserved in its state of being latched to (engaged with) the hook. The spare tire can thereby be prevented from falling off of the vehicle body (i.e., the spare tire carrier).

In a desired form, the tire cover comprises a metallic bottom front cover for covering a bottom front part of the spare tire. With this arrangement, when the bottom front part of the spare tire falls toward the road surface due to a shock load acting on the spare tire, the metal bottom front cover can come in contact with (be grounded on) the road surface. The metal bottom front cover can thereby be permitted to slide along the road surface toward the front of the vehicle body together with the vehicle. In other words, the bottom front part of the spare tire can be prevented from coming in contact with (being grounded on) the road surface, the spare tire can be prevented from bouncing back toward the rear of the vehicle body, and situations in which the rear of the vehicle body (i.e. the rear floor) is affected by a bouncing spare tire can be prevented.

It is preferred that the vehicle body rear part structure further comprise a cross member extending below the rear floor and above the spare tire in a width direction of the vehicle body, and the cross member have a bottom part inclined downwardly forwardly of the vehicle body, so that when a shock load is exerted on the spare tire from rearward of the vehicle body, the spare tire is guided downwardly forwardly of the vehicle body by the inclined bottom part of the cross member. Thus, when a shock load acts on the spare tire from the rear of the vehicle body, the spare tire can be guided at a downward slant toward the front of the vehicle body by the bottom part of the cross member. The spare tire can be prevented from interfering with the fuel system (e.g., the canister and other components) provided in proximity to the rear floor, and it is possible to ensure that the fuel system (the canister and other components) is not affected.

Preferably, the rear support part comprises a cylindrical part with an internal thread formed in an internal peripheral surface thereof, and a shaft provided with an external thread capable of threaded engagement with the internal thread of the cylindrical part, the cylindrical part being movable along the shaft by rotation of the shaft. The shaft may have a stopper part at an end part thereof, the stopper part being provided with interlocking projections capable of interlocking with a concave part formed on an external peripheral surface of the end part. The interlocking projections may have external inclined parts formed to provide parts tapering in cross section, the tapering parts being in fitted engagement with an internal peripheral surface of the cylindrical part, an end part of the cylindrical part being capable of coming in contact with the inclined parts to thereby prevent the cylindrical part from moving. The cylindrical part can thus be prevented from moving toward the end part of the shaft by the stopper part, and can also be prevented from falling off of (coming loose from) the end part of the shaft.

It is preferred that the cylindrical part have a hook capable of suspending the spare tire carrier, so that the spare tire held in the spare tire carrier is stored below the rear floor via the hook. Thus, when the spare tire carrier has been latched to (engaged with) the hook, the shaft can be rotated to raise and lower the hook. The hook can thereby be raised and lowered without excessive effort when the spare tire carrier has been latched to the hook, and operability can be simplified.

Furthermore, the cylindrical part can be firmly held by the interlocking projections as a result of the internal peripheral surface of the cylindrical part fitting with the cross-sectional tapering parts of the interlocking projections and the end part of the cylindrical part being brought into contact with the inclined parts of the interlocking projections. Consequently, the cylindrical part can be prevented from falling off of (coming loose from) the end part of the shaft even when a comparatively large load acts on the hook. The spare tire (a comparatively heavy object) held in the spare tire carrier can thereby be suitably supported by the hook.

It is preferred that the stopper part has a protector part for protecting the end part of the shaft. With this arrangement, the spare tire carrier can be prevented by the protector from interfering with the shaft and the cylindrical part, and the shaft and cylindrical part can be protected by the protector. Furthermore, the stopper part can be easily mounted to the end part of the shaft without excessive effort by having the interlocking projections of the stopper part interlock with the concave part of the shaft.

BRIEF DESCRIPTION OF THE DRAWINGS

Certain preferred embodiments of the present invention will be described in detail below, by way of example only, with reference to the accompanying drawings, in which:

FIG. 9A is an enlarged cross-sectional view taken along line 9A-9A of FIG. 7, while

FIG. 14 is a schematic view showing a manner in which air currents are led along the spare tire carrier;

FIG. 20A is an enlarged cross-sectional view taken along line 20A-20A of FIG. 17, while FIGS. 21A and 21B are cross-sectional views showing example embedding of a frame part in an embedding groove of FIG. 20A.

DETAILED DESCRIPTION OF THE PREFERRED EMBODIMENTS

Throughout the descriptions of the embodiments, the terms "front," "rear," "left," and "right" represent directions as seen from a driver; front is indicated by Fr, rear by Rr, left by L, and right by R.

(First Embodiment)

Figure 1:
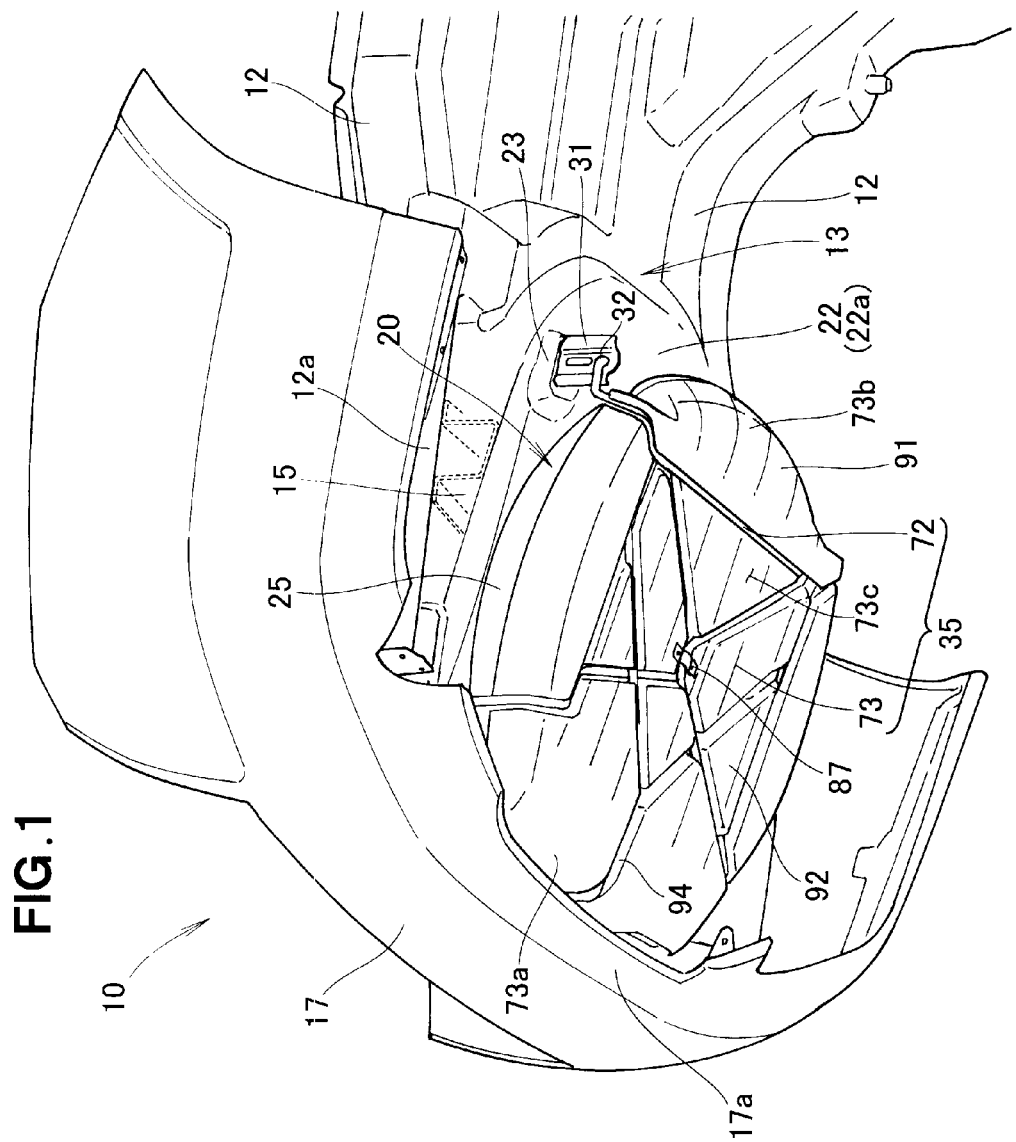
FIG. 1 is a perspective view illustrating a vehicle body rear part structure according to a first embodiment of the present invention.
Figure 2:
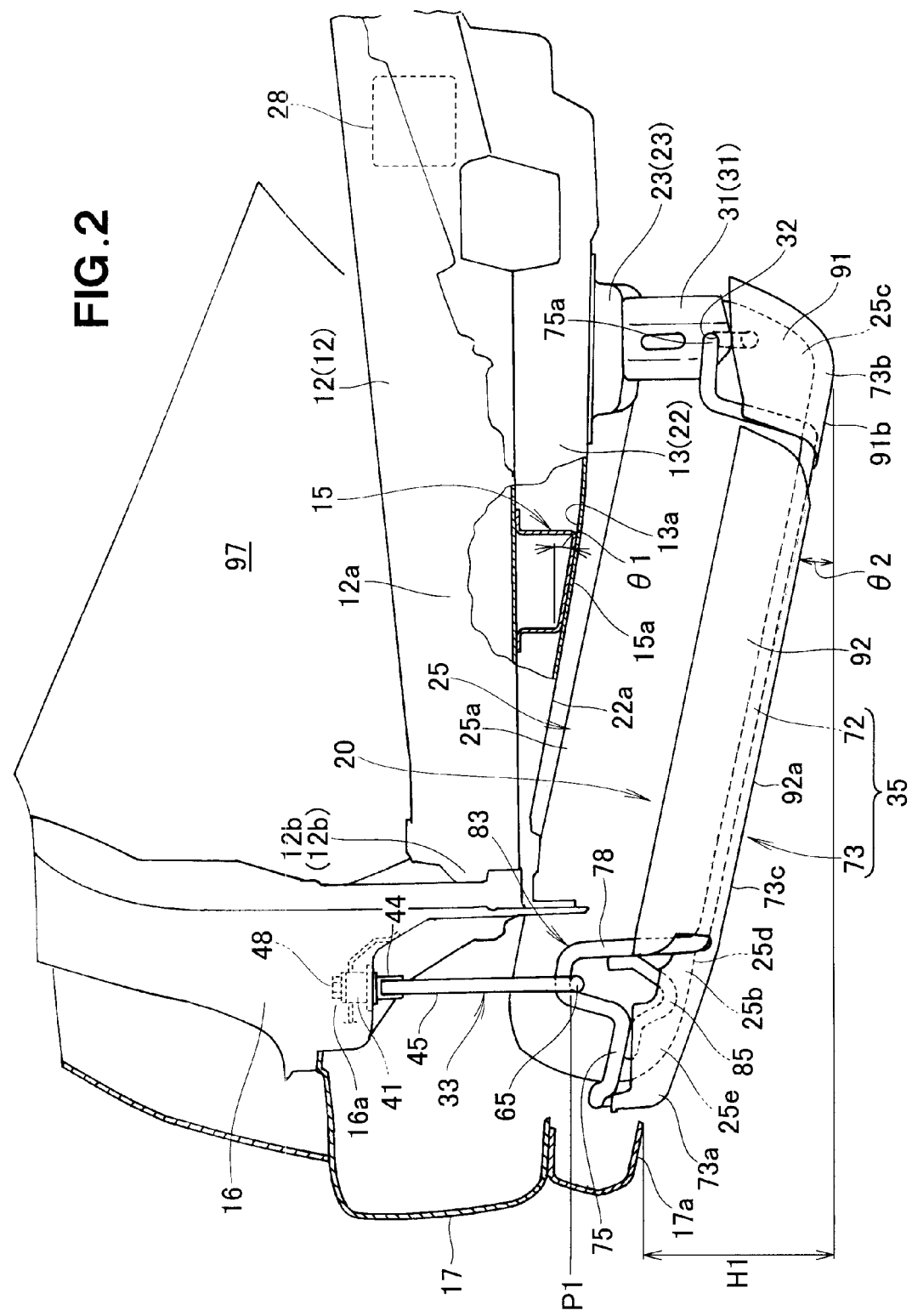
FIG. 2 is a side elevational view showing the vehicle body rear part structure of FIG. 1.
Figure 3:
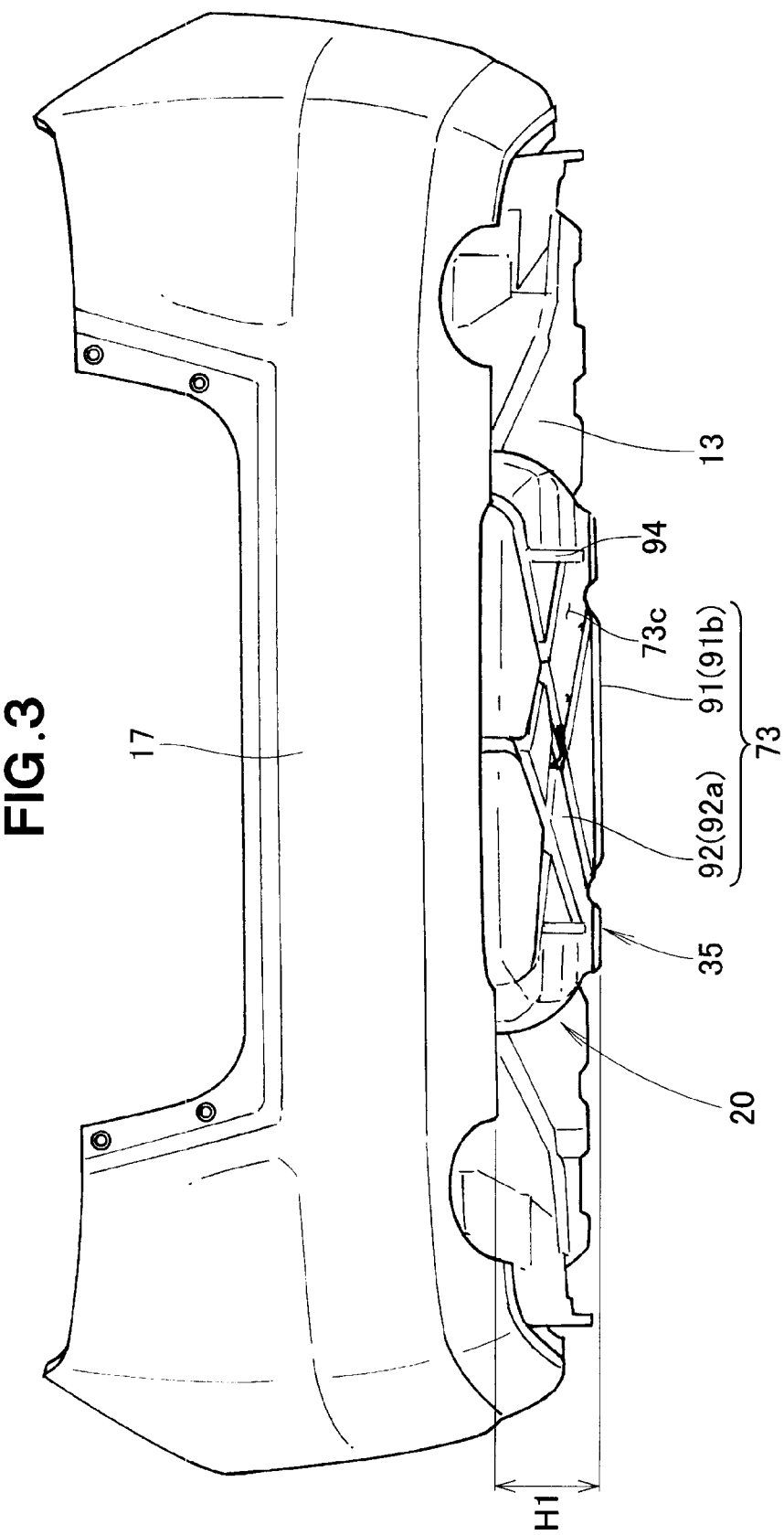
FIG. 3 is a rear view of the vehicle body rear part structure of FIG. 1.

A vehicle body rear part structure 10 comprises left and right rear side frames 12 extending in a vehicle body longitudinal direction, a rear floor 13 provided to the left and right rear side frames 12, a rear cross member 15 and rear panel 16 spanning between the left and right rear side frames 12, a rear bumper 17 provided on the vehicle-rear side of the rear panel 16, and carrier means 20 provided to the rear floor 13 and the rear panel 16, as shown in FIGS. 1 through 3.

The left and right rear side frames 12 are disposed parallel to each other across a predetermined gap in the vehicle width direction, and the rear side frames 12 extend in the vehicle body longitudinal direction.

The rear floor 13 is a floor panel provided to the left and right rear side frames 12.

In the substantial center of the rear floor 13 there is formed a ledge 22 which bulges downward. The ledge 22 has a floor bottom part 22a formed so as to slope downward toward the front of the vehicle body from the vicinity of the rear panel 16.

In the front end vicinity of the floor bottom part 22a are formed left and right mounting seats 23 which bulge downward.

The rear cross member 15 spans between center parts 12a in the substantial centers of the left and right rear side frames 12 in the vehicle body longitudinal direction, and extends in the vehicle width direction along the top surface 13a of the rear floor 13.

The rear cross member 15 is provided above the carrier means 20, and a member bottom part (bottom part) 15a is provided above a spare tire 25.

The member bottom part 15a is inclined at a downward inclination angle θ1 toward the front of the vehicle body along the top part 25a of the spare tire 25.

Consequently, when a shock load acts on the spare tire 25 from the rear of the vehicle body, the spare tire 25 can be guided by the member bottom part 15a in a downward incline toward the front of the vehicle body.

The spare tire 25 can thereby be prevented from interfering with the fuel system (e.g., a canister 28 and other components) provided in proximity to the rear floor 13. The reasons for forming the member bottom part 15a at a downward incline are described in detail in FIG. 15.

The spare tire 25 is supported by the carrier means 20 in a forward-inclined state having an inclination angle θ2 toward the front of the vehicle body.

The inclination angle θ2 of the spare tire 25 and the inclination angle θ1 of the member bottom part 15a have the relationship θ1=θ2, or θ1≈θ2.

The rear panel 16 spans between rear ends 12b of the left and right rear side frames 12.

The rear bumper 17 is provided to the side of the rear panel 16 facing the rear of the vehicle body.

The carrier means 20 comprises left and right front support parts (front support parts) 31 (see also FIG. 7) mounted to the left and right mounting seats 23 of the floor bottom part 22a, a rear support part (axial-direction movement device) 33 mounted to the right end 16a of the rear panel 16, and a spare tire carrier 35 provided to the left and right front support parts 31 and the rear support part 33.

The left front support part 31 is mounted at the top end to the left mounting seat 23 by bolts 34, 34 (FIG. 7), and the left front support part 31 thereby protrudes downward from the left mounting seat 23.

A support hole 32 is formed in the bottom end of the left front support part 31. A left front connecting part 75a (described hereinafter) of the spare tire carrier 35 is connected to the support hole 32 of the left front support part 31.

Figure 7:
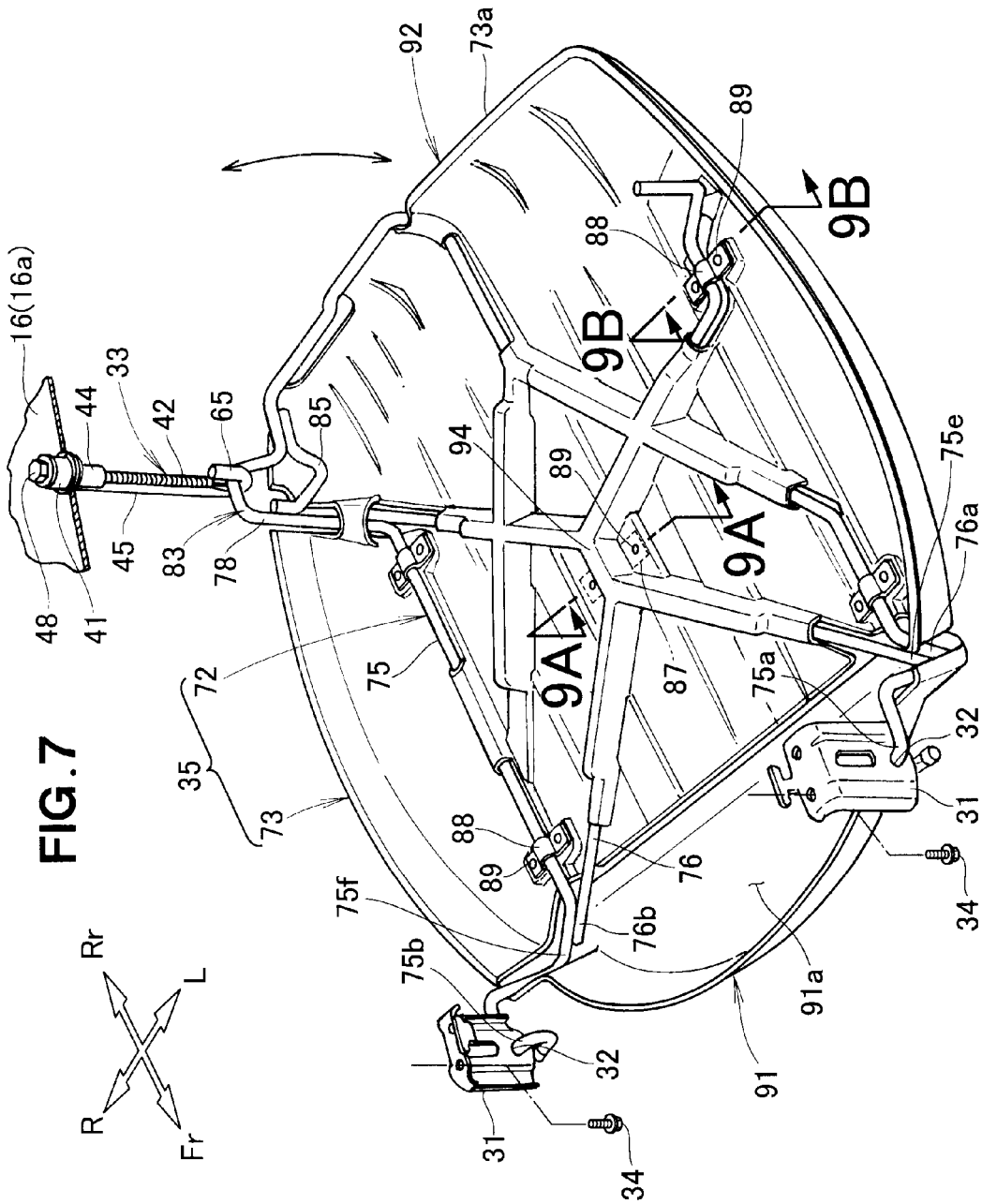
FIG. 7 is a perspective view showing a spare tire carrier of the vehicle body rear part structure of FIG. 1.

The right front support part 31 shown in FIG. 7 is a member bilaterally symmetrical with the left front support part 31, and is denoted by the same numerical symbol as the left front support part 31 and is not described.

A right front connecting part 75b (described hereinafter) of the spare tire carrier 35 is connected to the support hole 32 of the right front support part 31.

Figure 4:
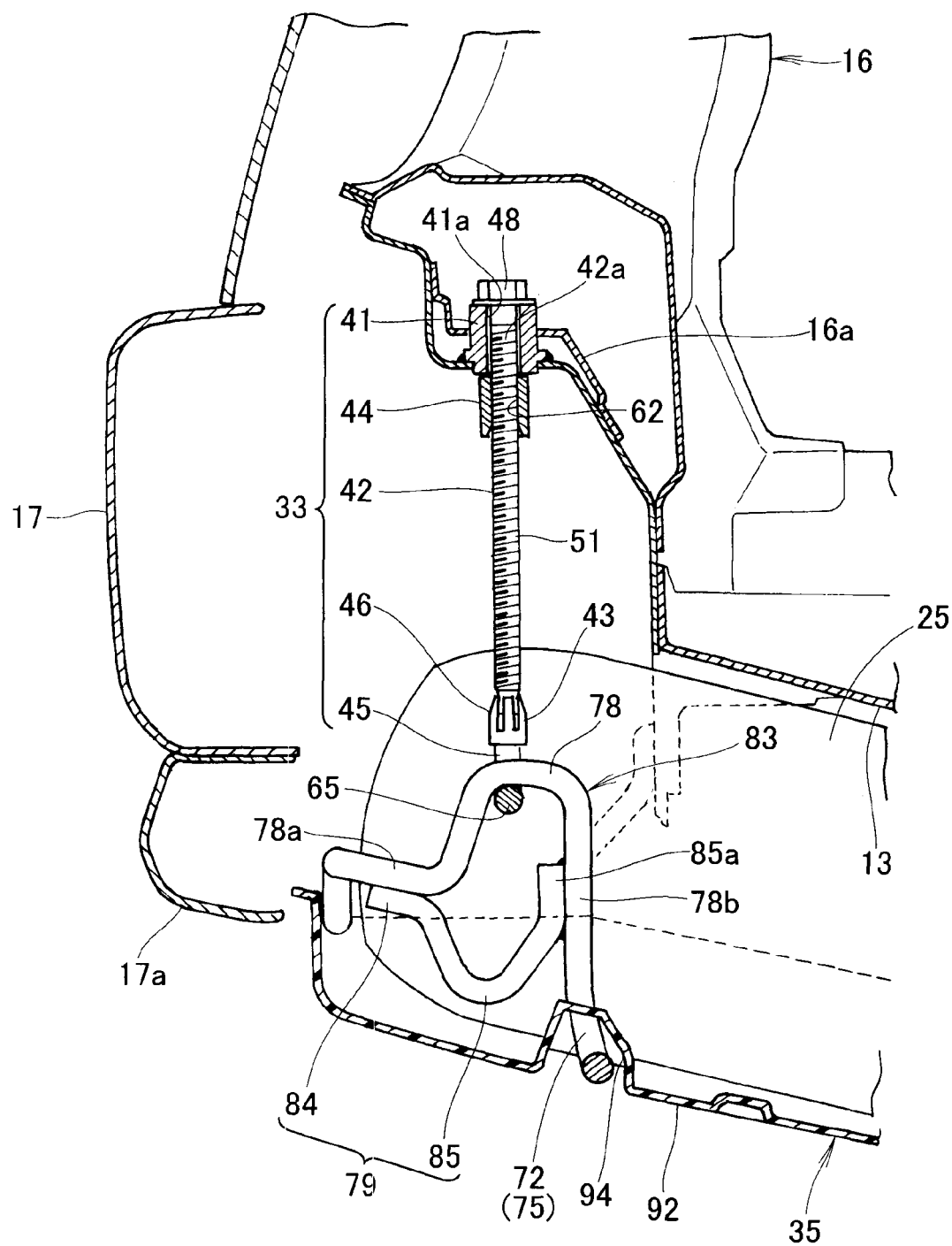
FIG. 4 is a cross-sectional view showing a rear support part of FIG. 2.
Figure 5:
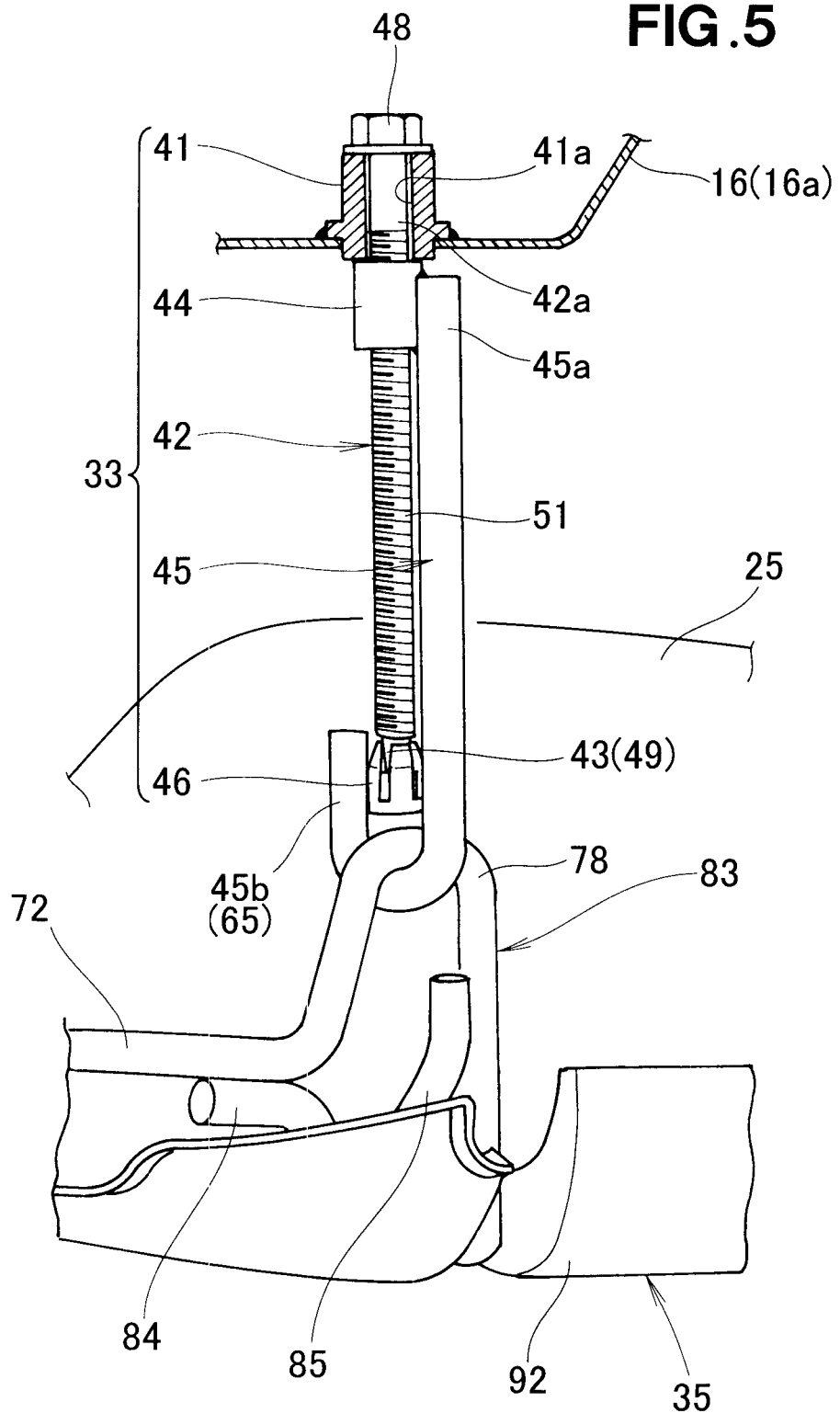
FIG. 5 is a perspective view showing the rear support part of FIG. 4.

The rear support part 33 comprises a support boss 41 mounted to the right end 16a of the rear panel 16, a shaft 42 rotatably supported in a through-hole 41a of the support boss 41, a cylindrical part 44 threadedly fitted over the shaft 42, a hook 45 provided to the cylindrical part 44, and a stopper part 46 provided to an end part 43 (see FIG. 6) of the shaft 42, as shown in FIGS. 4 and 5. A rear connecting part 83 (described hereinafter) of the spare tire carrier 35 is connected to the hook 45 of the rear support part 33.

The support boss 41 is bonded to the right end 16a of the rear panel 16, and the through-hole 41a is disposed so as to be aligned in a vertical direction.

Figure 6A:
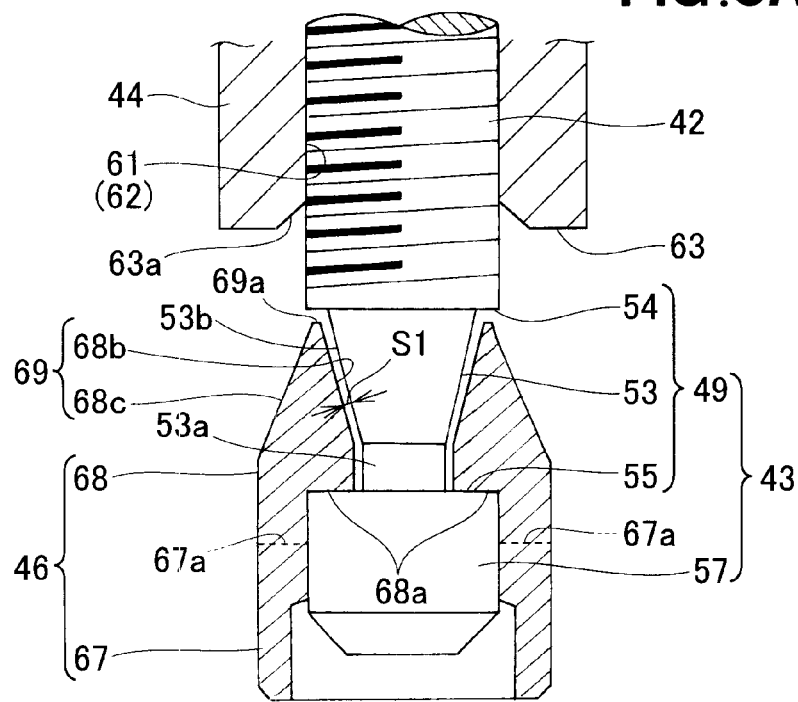
FIGS. 6A and 6B respectively illustrate in cross-section and perspective a shaft and a stopper part of the rear support part of FIG. 5.
Figure 6B:
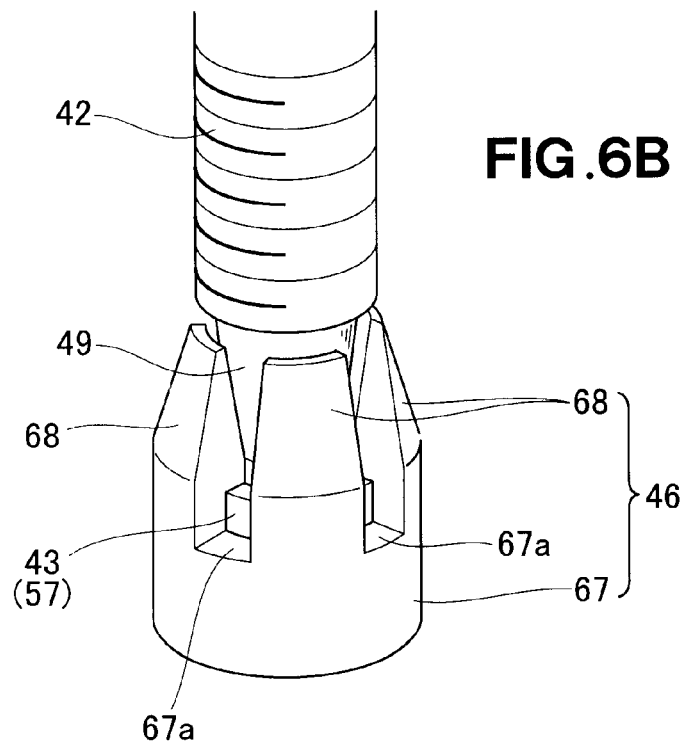

The shaft 42 is rotatably supported in the through-hole 41a of the support boss 41, a nut 48 is integrally formed on the top of the shaft 42, a shaft concave part (concave part) 49 is formed in an annular fashion around the external peripheral surface of the end part 43 shown in FIG. 6A, and an external thread 51 is formed on the external peripheral surface of the shaft 42 from a region 42a in proximity to the nut 48 to the shaft concave part 49.

The shaft concave part 49 is formed into an annular concave shape consisting of a shaft bottom part 53, a top wall 54, and a bottom wall 55, as shown in FIG. 6A.

The shaft bottom part 53 comprises a small-diameter bottom part 53a and an inclined bottom part 53b. The inclined bottom part 53b is formed into an inclined shape so that the outside diameter gradually increases upward from the small-diameter bottom part 53a.

By forming the shaft concave part 49 in the end part 43 of the shaft 42, an interlocking edge part 57 is formed in the end edge of the end part 43.

The cylindrical part 44 has an internal thread 62 formed in the internal peripheral surface 61, and a tapered part 63a is formed in a bottom end part (end part) 63 of the cylindrical part 44. The internal thread 62 of the cylindrical part 44 is threadably joined with the external thread 51 of the shaft 42.

In this state, the nut 48 of the shaft 42 is operated with a work tool to rotate the shaft 42, whereby the cylindrical part 44 can be moved along the shaft 42.

A top end 45a of the hook 45 is provided on the external peripheral wall of the cylindrical part 44, and a bottom end 45b is curved upward as shown in FIG. 5.

Curving the bottom end 45b upward forms a hook 65 from which the spare tire carrier 35 (i.e., the annular rear connecting part 83) can be hung.

In other words, the spare tire 25 placed in the spare tire carrier 35 can be stored with the hook 65.

The stopper part 46 is a member made of resin and capable of interlocking with the interlocking edge part 57 of the end part 43, as shown in FIG. 6A.

The stopper part 46 has a protector 67 for protecting the end part 43 of the shaft 42, and a plurality of interlocking projections 68 which protrude upward from the protector 67.

The protector 67 is formed into an annular shape so as to cover the interlocking edge part 57 of the end part 43, and is a region with which the spare tire carrier 35 (the annular rear connecting part 83) shown in FIG. 5 can be in contact. The annular rear connecting part 83 can be prevented from interfering with the interlocking edge part 57 of the end part 43 by coming in contact with the protector 67.

Consequently, the interlocking edge part 57 of the end part 43 (i.e., the rear support part 33) can be protected from the spare tire carrier 35 by the protector 67.

The interlocking projections 68 are provided at equal intervals along the circumferential direction in the top part of the annular protector 67.

At the bases of the interlocking projections 68, concave interlocking parts 68a are formed. The concave interlocking parts 68a interlock with the bottom wall 55 of the shaft concave part 49, whereby the interlocking 68a projections 68 (i.e., the stopper part 46) are provided to the end part 43.

In other words, the interlocking projections 68 are formed so as to be capable of interlocking with the shaft concave part 49.

The interlocking projections 68 have inner inclined parts 68b formed above and inside of the concave interlocking parts 68a, and outer inclined parts (inclined parts) 68c formed on the outside, thereby forming cross-sectional tapering parts 69 which taper upward.

When the cross-sectional tapering parts 69 have interlocked with the shaft concave part 49, the inner inclined parts 68b are disposed at a predetermined gap S1 from the inclined bottom part 53b of the shaft concave part 49.

Furthermore, distal ends 69a of the cross-sectional tapering parts 69 are disposed in a state of facing (opposing) the top wall 54 of the shaft concave part 49.

In this state, when the cylindrical part 44 has been lowered to the end part 43 of the shaft 42, the internal peripheral surface 61 of the cylindrical part 44 fits with the outer inclined parts 68c of the cross-sectional tapering parts 69, and the tapered part (end parts) 63a of the cylindrical part 44 come in contact with the outer inclined parts 68c.

The cylindrical part 44 can thereby be prevented from coming out of the end part 43 of the shaft 42 by the stopper part.

The spare tire carrier 35 comprises a steel frame part 72 provided below the rear floor 13 (see FIG. 2) via the left and right front support parts 31 and the rear support part 33, and a tire cover 73 provided to the steel frame part 72, as shown in FIG. 7.

The spare tire carrier 35 is a member for supporting the spare tire 25 in a substantially transversely aligned state (specifically, in a forward incline having an inclination angle θ2 toward the front of the vehicle body), as shown in FIG. 2.

Figure 8:
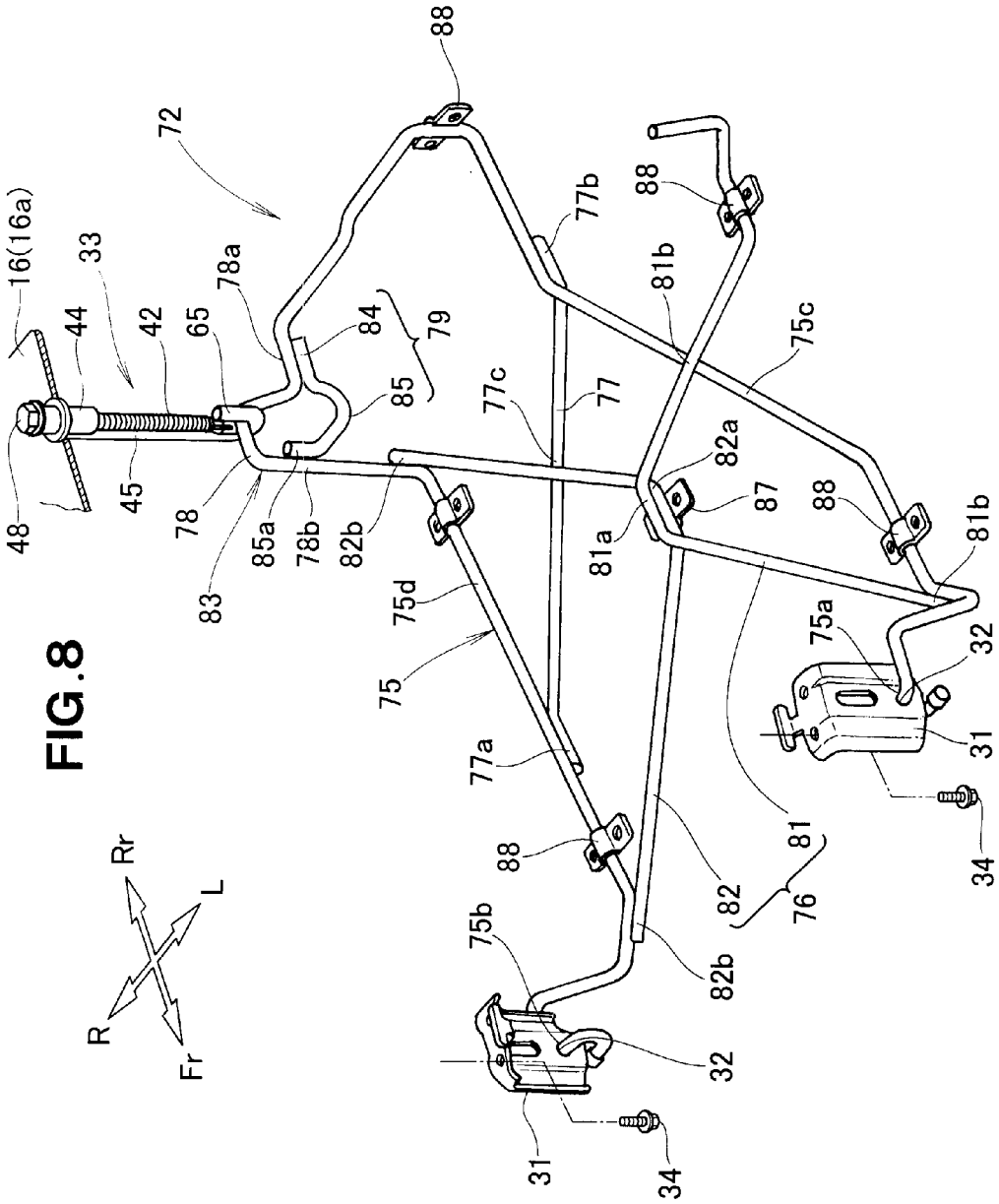
FIG. 8 is a perspective view showing a frame part of the spare tire carrier of FIG. 7.

The frame part 72 comprises a main frame 75 forming an external frame of the frame part 72, an X frame 76 provided on the inside of the main frame 75 and reinforcing the main frame 75, a connecting frame 77 for connecting the X frame 76 and the main frame 75, and lower half annular frame 79 provided to an upper half annular part 78 of the main frame 75, as shown in FIG. 8.

The main frame 75 is a steel member obtained by bending a rod into a substantial U shape in a plan view.

The main frame 75 has the left front connecting part (front connecting part) 75a rotatably connected to the support hole 32 of the left front support part 31, the right front connecting part (front connecting part) 75b rotatably connected to the support hole 32 of the right front support part 31, and the upper half annular part 78 capable of latching (engaging) with the hook 65 of the rear support part 33.

The upper half annular part 78 is formed in the right rear end of the main frame 75.

The X frame 76 has a substantially V-shaped left frame 81 made of steel and obtained by bending a rod into a substantial V shape, and a substantially V-shaped right frame 82 made of steel and obtained by bending a rod into a substantial V shape, wherein the substantial X shape is formed by the apex part 81a of the left substantially V-shaped frame 81 being joined to the apex part 82a of the right substantially V-shaped frame 82.

In this X frame 76, a joining region 81b of the left substantially V-shaped frame 81 is joined to a left-side rod 75c of the main frame 75, and a joining region 82b of the right substantially V-shaped frame 82 is joined to a right-side rod 75d of the main frame 75.

The main frame 75 can thereby be reinforced by the X frame 76.

The connecting frame 77 is a steel rod wherein a front end 77a is joined to the right-side rod 75d of the main frame 75, a rear end 77b is joined to the left-side rod 75c of the main frame 75, and a center part 77c is joined to the right substantially V-shaped frame 82.

The main frame 75 can thereby be reinforced by the connecting frame 77.

The lower half annular frame 79 is a steel rod having a straight part 84 joined to a region 78a in the vicinity of the upper half annular part 78 of the main frame 75, and a lower half annular part 85 provided to the front end of the straight part 84.

The lower half annular part 85 is formed into a concave shape protruding downward, and a front end 85a is joined to a front end part 78b of the upper half annular part 78. The upper half annular part 78 is formed into a concave shape protruding upward.

The annular rear connecting part 83 is formed from the lower half annular part 85 and the upper half annular part 78. The annular rear connecting part 83 is provided to the right-side rear end of the steel frame part 72, and the upper half annular part 78 latches with the hook 65 of the rear support part 33.

Thus, the rear connecting part 83 is formed into an annular shape, whereby the rear connecting part 83 can be prevented from separating from the hook 65.

The reasons for forming the rear connecting part 83 into an annular shape are described in detail in FIGS. 15 and 16.

The frame part 72 is mounted (provided) to the tire cover 73 by a plurality of mounting brackets 87, 88 and rivets 89 (see FIG. 9), as shown in FIG. 7.

The tire cover 73 is a cover for covering the bottom part 25b (see FIG. 2) of the spare tire 25 while holding the spare tire 25 in a substantially transverse alignment (specifically, in a state of incline toward the front of the vehicle body).

The tire cover 73 comprises a metal bottom front cover 91 for covering a bottom front part 25c (see FIG. 2) in the bottom part 25b of the spare tire 25, and a bottom rear cover 92 made of a resin and used for covering the remaining region 25d (see FIG. 2) of the spare tire 25.

The remaining region 25d of the spare tire 25 shown in FIG. 2 is the region extending from the rear of the bottom front part 25c to a bottom rear part 25e in the bottom part 25b of the spare tire 25, i.e., the region on the side of the bottom front part 25c facing the rear of the vehicle body.

Figure 9A:
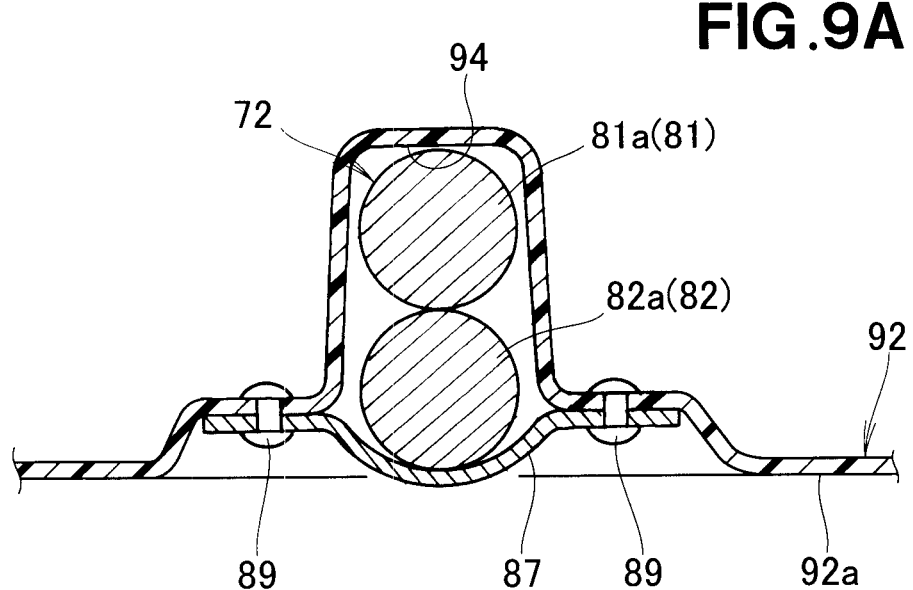

The bottom rear cover 92 made from a resin is formed into a substantially rectangular shape in a plan view, and in the external surface 92a shown in FIG. 9A is formed an embedding groove (embedded concavity) 94 which is concave toward the inside of the bottom rear cover 92.

The frame part 72 is fitted into the embedding groove 94 from the outside of the tire cover 73 (the bottom rear cover 92), as shown in FIG. 9A.

Having been fitted into the embedding groove 94, the frame part 72 (the apex part 81a of the left substantially V-shaped frame 81 and the apex part 82a of the right substantially V-shaped frame 82) is mounted (provided) to the bottom rear cover 92 by the mounting bracket 87 and the rivets 89, 89.

The frame part 72 (the apex part 81a of the left substantially V-shaped frame 81 and the apex part 82a of the right substantially V-shaped frame 82) is thereby embedded into the embedding groove 94.

By embedding the frame part 72 in the embedding groove 94, the frame part 72 can be concealed so as to not be visible from the outside of the vehicle body.

Furthermore, by embedding the frame part 72 in the embedding groove 94, the frame part 72 can be prevented from protruding from the external surface 92a of the bottom rear cover 92, and the external surface 92a of the bottom rear cover 92 can be ensured to be flat.

Figure 9B:
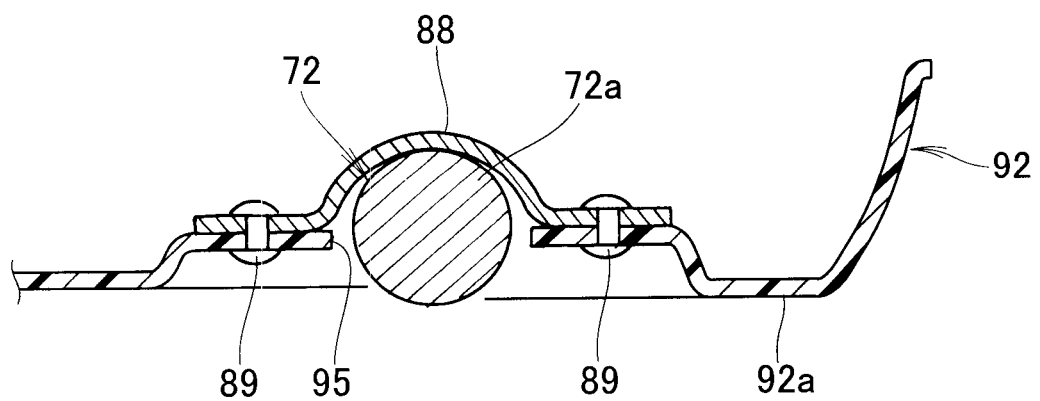
FIG. 9B is an enlarged cross-sectional view taken along line 9B-9B of FIG. 7.

By having the frame part 72 embedded in the embedding groove 94, the rod region 72a of the frame part 72 not embedded in the embedding groove 94 is fitted into a groove 95 in the bottom rear cover 92 as shown in FIG. 9B.

The rod region 72a fitted into the groove 95 is mounted (provided) to the bottom rear cover 92 by the mounting bracket 88 and the rivets 89, 89.

Thus, by fitting the rod region 72a into the groove 95, the rod region 72a can be prevented from protruding from the external surface 92a of the bottom rear cover 92, and the external surface 92a of the bottom rear cover 92 can be kept flat.

In the metal bottom front cover 91 as shown in FIG. 7, the region 75e in the vicinity of the left front connecting part 75a of the main frame 75, the region 75f in the vicinity of the right front connecting part 75b of the main frame 75, a left front end 76a of the X frame 76, and a right front end 76b of the X frame 76 are joined to an inside surface 91a of the bottom front cover 91.

Consequently, the metal bottom front cover 91 is provided to the frame part 72 integrally with the bottom rear cover 92 made of resin.

An external surface 91b of the metal bottom front cover 91 is disposed so as to be substantially coplanar with the external surface 92a of the resinous bottom rear cover 92 as shown in FIGS. 2 and 3.

In other words, the metal bottom front cover 91 and the bottom rear cover 92 made of a resin are integrally provided to the frame part 72.

The bottom part 25b of the spare tire 25 supported by the frame part 72 can thereby be covered by the bottom front cover 91 and the bottom rear cover 92 (i.e. the tire cover 73).

By covering the bottom part 25b of the spare tire 25 with the tire cover 73 in this manner, the bottom part 25b of the spare tire 25 can be concealed by the tire cover 73.

Consequently, the bottom part 25b of the spare tire 25 can be lowered below the rear bumper 17 so that the bottom part 25b of the spare tire 25 cannot be seen from outside the vehicle (i.e., in a state of ensuring a favorable outward appearance).

Specifically, a rear end 73a of the tire cover 73 is disposed at substantially the same height as a bottom part 17a of the rear bumper 17, and the tire cover 73 is inclined in a forward incline having an inclination angle θ2 toward the front of the vehicle body.

Consequently, the height of a front end 73b of the tire cover 73 can be lowered to a height H1 below the bottom part 17a of the rear bumper 17.

In other words, the tire cover 73 (the bottom part 25b of the spare tire 25) can be lowered below the rear bumper 17.

The floor bottom part 22a of the rear floor 13 can thereby be lowered in accordance with the spare tire 25, and a large rear cabin space 97 in the vehicle can therefore be ensured.

In addition, the embedding groove 94 is formed in the bottom rear cover 92, and the frame part 72 is embedded in the embedding groove 94 as shown in FIG. 9A.

Consequently, the frame part 72 can be prevented from protruding beyond the external surface 73c of the tire cover 73, and the external surface 73c of the tire cover 73 can be kept substantially flat, as shown in FIGS. 2 and 3.

Air currents can thereby flow smoothly along the external surface 73c of the tire cover 73, aerodynamic performance can be improved, and fuel consumption performance can be improved.

The metal bottom front cover 91 is a cover for covering the bottom front part 25c of the spare tire 25 in a state in which the spare tire 25 is disposed in a substantially transverse alignment (i.e., in a forward incline having an inclination angle θ2 toward the front of the vehicle body) as shown in FIG. 2.

Consequently, when the bottom front part 25c of the spare tire 25 falls toward the road surface 101 (see FIG. 16B) due to a shock load acting on the spare tire 25, the metal bottom front cover 91 can be brought in contact with the road surface 101 (the ground).

The bottom front cover 91 is covered by a metal cover, and is thereby capable of sliding with the vehicle toward the front of the vehicle body along the road surface 101.

The reasons for covering the bottom front cover 91 with a metal cover are described in detail using FIG. 16.

The annular rear connecting part 83 of the spare tire carrier 35 latches with the hook 65, whereby the spare tire 25 is held in a substantially transverse alignment by the spare tire carrier 35.

The spare tire 25 is thereby stored in a forward-inclined storage position having an inclination angle θ2 toward the front of the vehicle body.

When the annular rear connecting part 83 has been latched to the hook 65, the nut 48 of the shaft 42 shown in FIG. 7 can be operated by a work tool to turn the shaft 42.

Turning the shaft 42 allows the hook 65 to be raised and lowered (moved vertically) together with the cylindrical part 44 without excessive effort.

Raising and lowering the hook 65 (moving the hook vertically) allows the rear end 73a of the tire cover 73 to be easily raised and lowered in the direction of the arrows about the left and right front connecting parts 75a, 75b as an axis.

The left and right front connecting parts 75a, 75b are rotatably supported on the left and right front support parts 31.

Thus, the rear end 73a of the tire cover 73 is easily raised and lowered in the direction of the arrows, whereby the ease of operation can be improved when the rear end 73a of the tire cover 73 is raised and lowered.

Figure 13A:
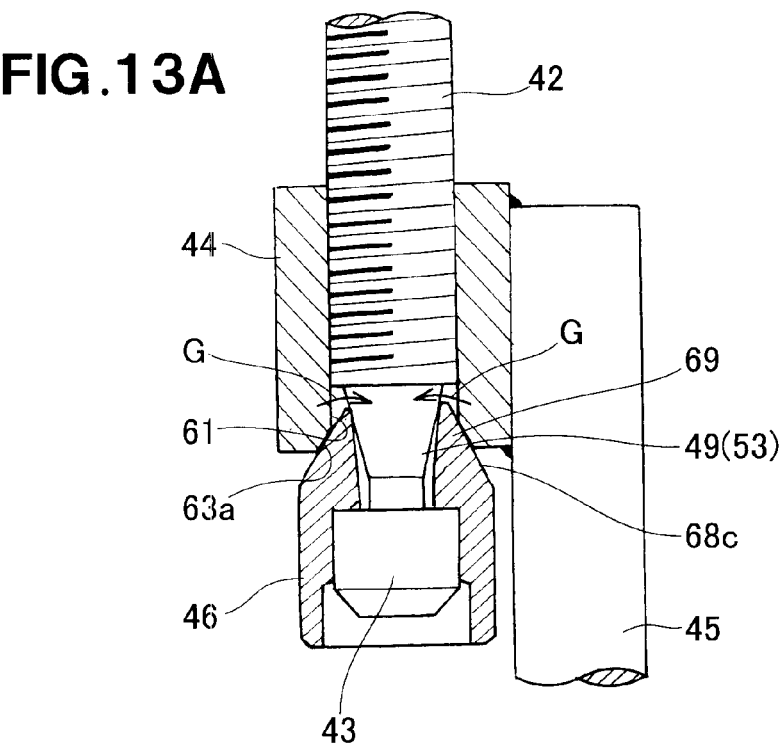
FIGS. 13A and 13B illustrate how a spare tire is released from the spare tire carrier.
Figure 13B:
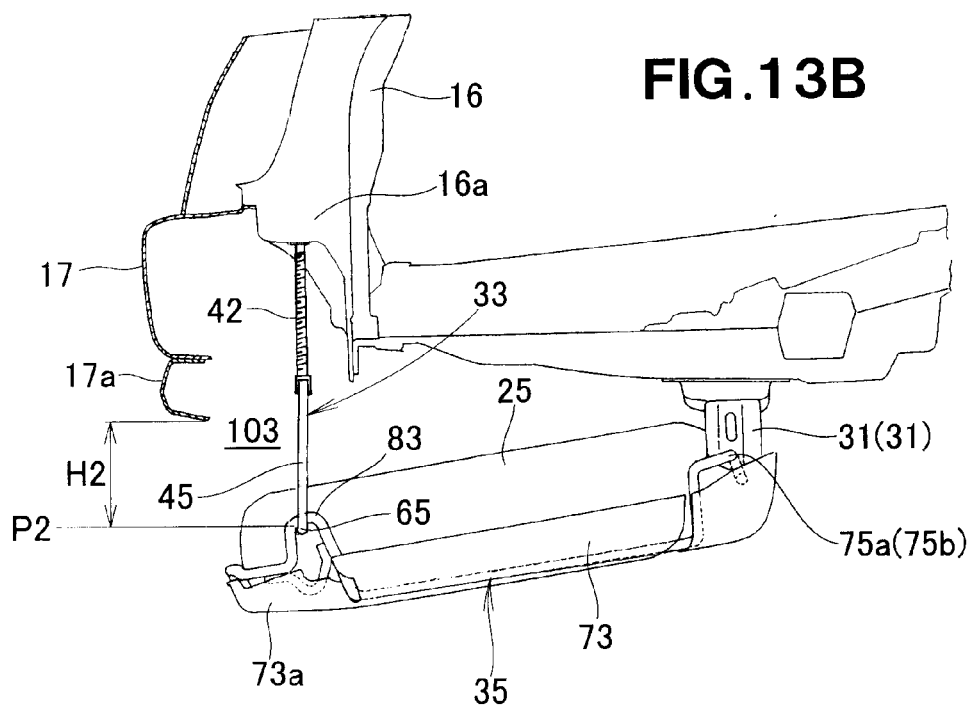

By raising and lowering the rear end 73a of the tire cover 73 in the direction of the arrows, the annular rear connecting part 83 (i.e., the spare tire carrier 35) can be placed in a tire storage position P1 and a tire accessing position P2 (see FIG. 13B).

The tire storage position P1 is a position in which the spare tire 25 can be stored.

The tire accessing position P2 is a position in which the spare tire 25 can be replaced.

Next, the procedure of mounting the stopper part 46 to the shaft 42 of the rear support part 33 will be described based on FIGS. 10A and 10B.

Figure 10A:
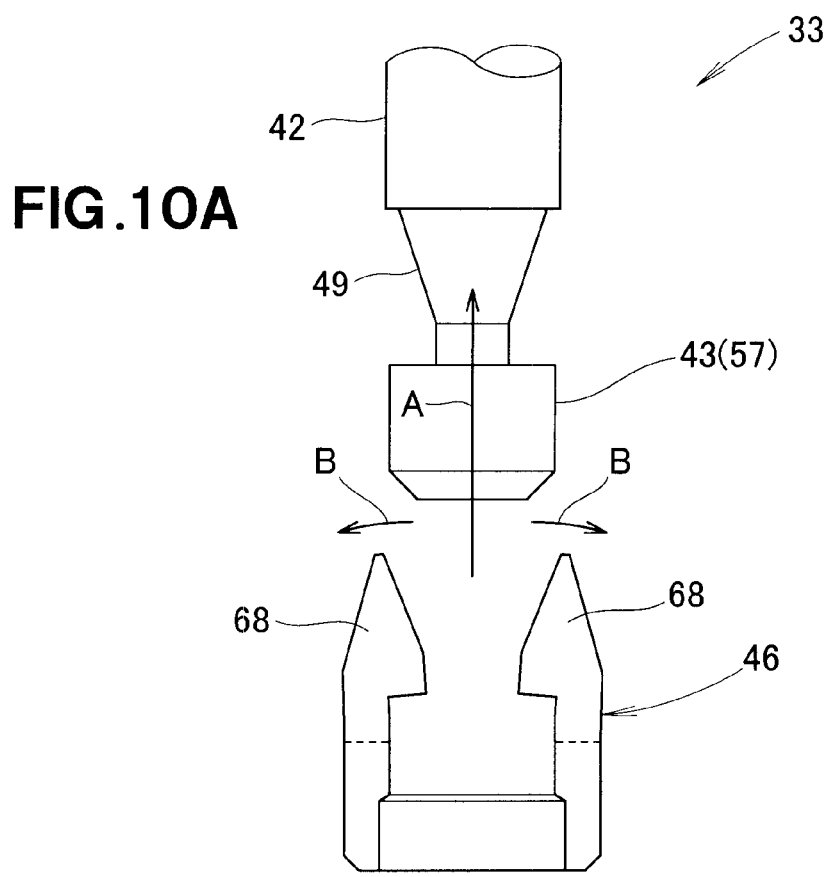
FIGS. 10A and 10B illustrate a manner of mounting of the stopper part to the shaft of FIG. 6A.

The stopper part 46 is moved in the direction of arrow A toward the end part 43 of the shaft 42, as shown in FIG. 10A.

The interlocking projections 68 of the stopper part 46 come in contact with the end part 43, and the interlocking projections 68 elastically deform in the directions of arrows B and widen outward.

In this state, the stopper part 46 continuously moves in the direction of arrow A, and the interlocking projections 68 thereby pass over the interlocking edge part 57.

Figure 10B:
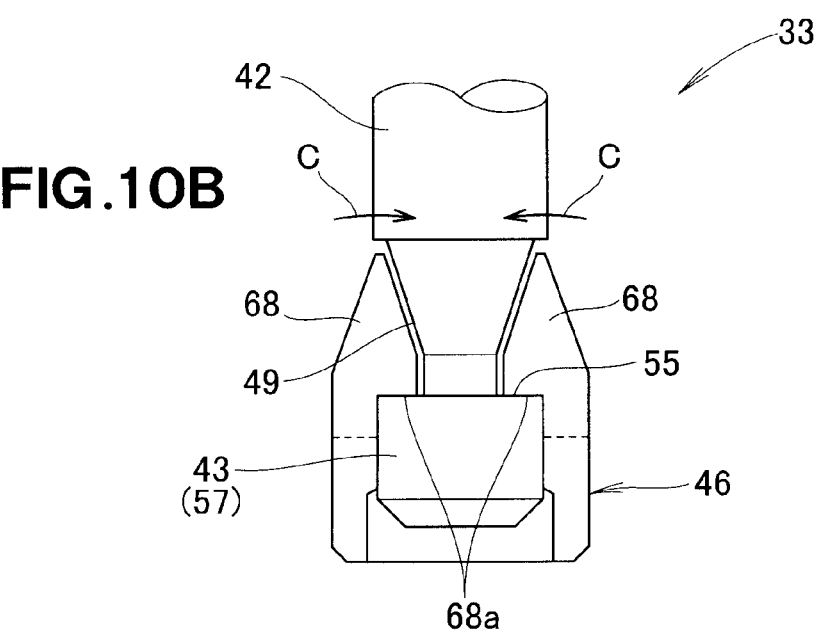

By passing over the interlocking edge part 57, the interlocking projections 68 return to their original state indicated by arrows C, as shown in FIG. 10B.

The interlocking projections 68 return to their original state, the interlocking projections 68 fit into the shaft concave part 49, and the concave interlocking parts 68a of the interlocking projections 68 interlock with the bottom wall 55 of the shaft concave part 49.

The interlocking projections 68, i.e., the stopper part 46 can thereby be mounted on the end part 43 of the shaft 42.

Causing the interlocking projections 68 to elastically deform and interlock with the shaft concave part 49 of the shaft 42 thus enables the stopper part 46 to be easily mounted to the end part 43 of the shaft 42 without excessive effort.

Figure 11A:
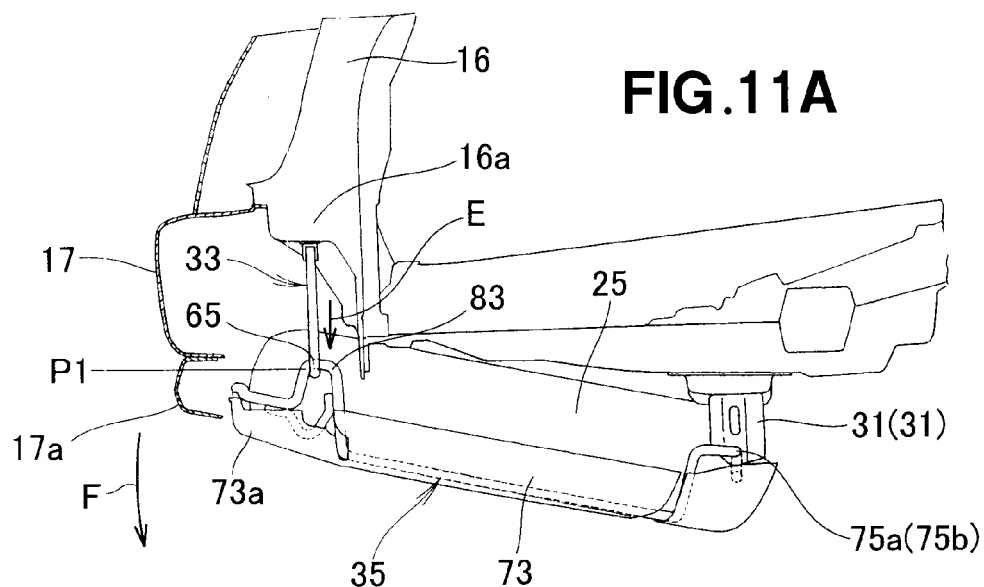
FIGS. 11A and 11B illustrate how a rear end of the spare tire carrier lowers.
Figure 11B:
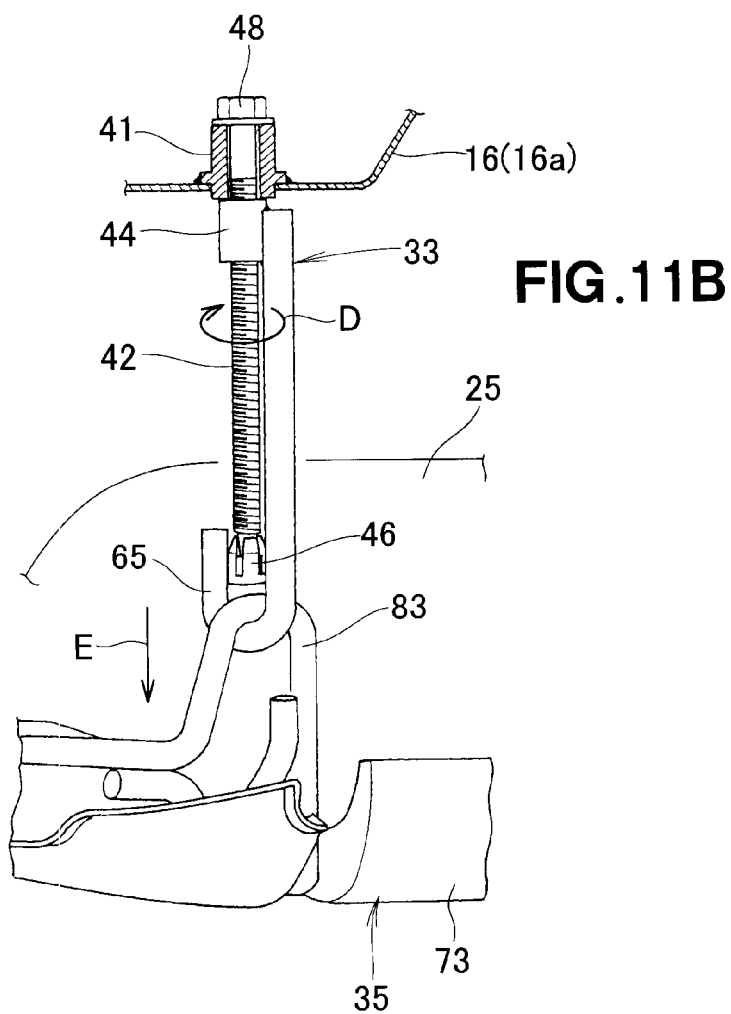
Figure 12:
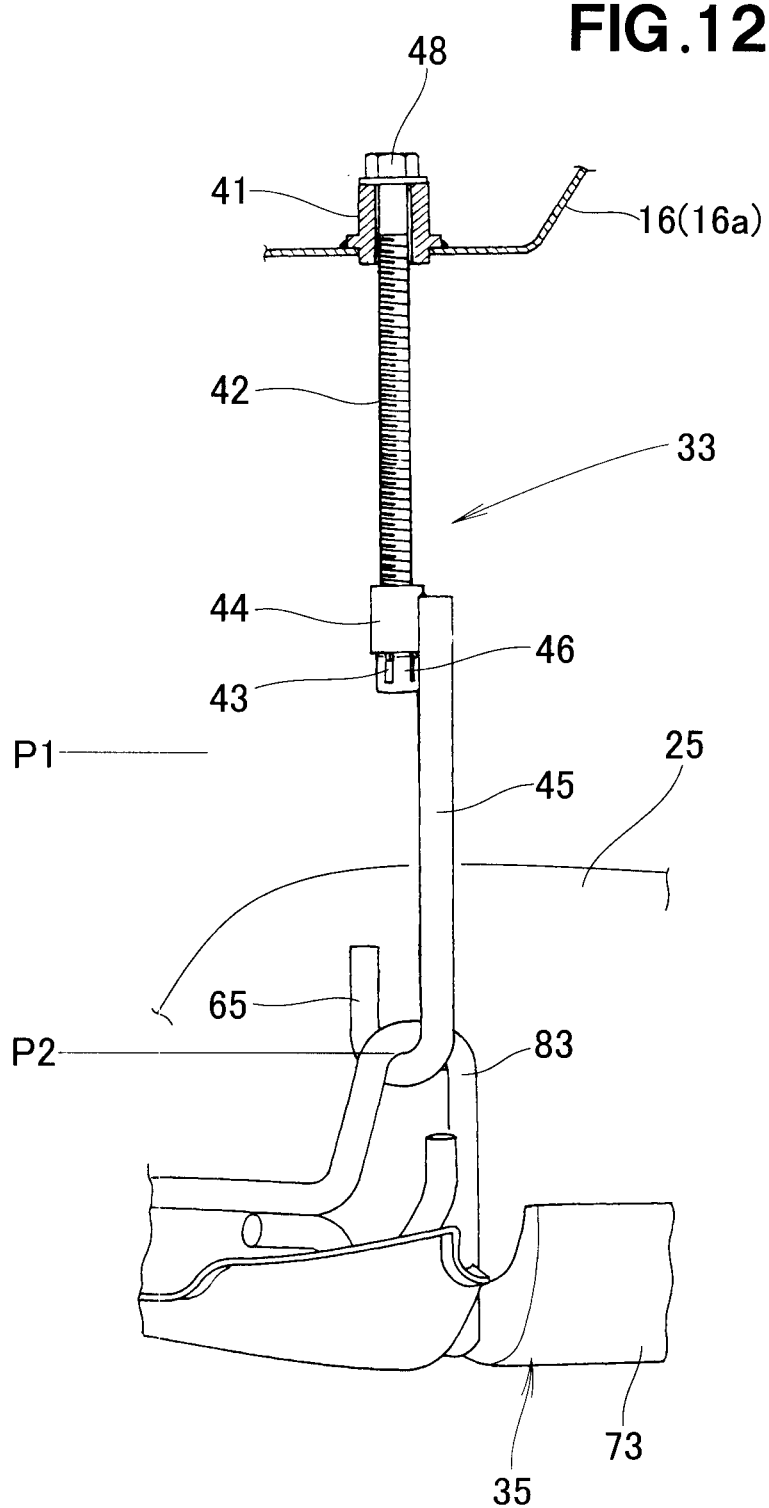
FIG. 12 is a schematic view showing a rear support part of FIG. 11B, with a hook placed in a lowered position.

Next, the procedure of removing the spare tire 25 from the spare tire carrier 35 is described based on FIGS. 11 to 13.

The left and right front connecting parts 75a, 75b of the spare tire carrier 35 are rotatably connected to the left and right front support parts 31 as shown in FIG. 11A.

The annular rear connecting part 83 of the spare tire carrier 35 is latched to the rear support part 33 (specifically, to the hook 65). The hook 65 (the annular rear connecting part 83) is disposed in the tire storage position P1.

In this state, the spare tire 25 is stored in the spare tire carrier 35 while being disposed in a substantially transverse alignment (specifically, in a forward incline having an inclination angle θ2 toward the front of the vehicle body).

With the annular rear connecting part 83 latched to the hook 65 as shown in FIG. 11B, the nut 48 of the shaft 42 is turned as indicated by arrow D.

The rotation of the shaft 42 causes the cylindrical part 44 together with the hook 65 to descend as indicated by arrow E.

Returning to FIG. 11A, the lowering of the hook 65 as indicated by arrow E causes the rear end 73a of the tire cover 73 to descend as indicated by arrow F about the left and right front connecting parts 75a, 75b as an axis.

The lowering of the cylindrical part 44 to the end part 43 of the shaft 42 causes the hook 65 (the annular rear connecting part 83) to be disposed in the tire accessing position P2 as shown in FIG. 12.

When the cylindrical part 44 has been lowered to the end part 43 of the shaft 42 as shown in FIG. 13A, the internal peripheral surface 61 of the cylindrical part 44 fits with the outer inclined parts 68c of the cross-sectional tapering parts 69.

The cross-sectional tapering parts 69 elastically deform as indicated by arrows G and come in contact with the shaft bottom part 53 of the shaft concave part 49.

In this state, the tapered part 63a of the cylindrical part 44 comes in contact with the outer inclined parts 68c of the cross-sectional tapering parts 69, whereby the tapered part 63a digs into the cross-sectional tapering parts 69.

Having the tapered part 63a dig into the cross-sectional tapering parts 69 enables the cylindrical part 44 to be firmly held in place by the interlocking projections 68, even using the stopper part 46 made of resin.

The stopper part 46 can be made of a resin, the manufacture of the stopper part 46 can be simplified, and costs can be minimized.

Thus, having the cylindrical part 44 held securely in place by the interlocking projections 68 enables the cylindrical part 44 to be kept from falling off of (coming loose from) the end part 43 of the shaft 42 even when a comparatively large downward force is exerted on the hook 65.

The spare tire 25 (a comparatively heavy object) held in the spare tire carrier 35 can thereby be suitably supported by the rear support part 33.

Having the hook 65 (the annular rear connecting part 83) disposed in the tire accessing position P2 as shown in FIG. 13B causes the rear end 73a of the tire cover 73 to be lowered by a distance H2 from the bottom part 17a of the rear bumper 17.

Consequently, a space 103 is provided between the bottom part 17a of the rear bumper 17 and the rear end 73a of the tire cover 73, and this space 103 is used to insert or remove the spare tire 25.

When a spare tire 25 is to be stored in the spare tire carrier 35, the procedure described in FIGS. 11 to 13 is performed in reverse.

The left and right front connecting parts 75a, 75b are rotatably connected to the left and right front support parts 31, and the annular rear connecting part 83 is latched (engaged) to the hook 65 as described in FIGS. 11 to 13.

Consequently, the rear end 73a of the tire cover 73 can be raised and lowered to cause the tire cover 73 to be disposed in the tire storage position P1 and the tire accessing position P2.

The spare tire 25 can thereby be replaced merely by raising and lowering only the rear end 73a of the tire cover 73.

Therefore, the operating force needed in cases of replacing the spare tire 25 can be minimized, and the spare tire 25 can be easily replaced without excessive effort.

The following is a description, made with reference to FIGS. 9A and 14, of an example in which air currents flow smoothly over the spare tire carrier 35.

The embedding groove 94 is formed in the bottom rear cover 92, and the frame part 72 is embedded in the embedding groove 94 as shown in FIG. 9A.

The frame part 72 can be prevented from protruding beyond the external surface 73c of the tire cover 73, and the external surface 73c of the tire cover 73 can be kept substantially flat, as shown in FIG. 14.

When the tire cover 73 is disposed in the tire storage position P1, air currents can thereby flow smoothly along the external surface 73c of the tire cover 73 as indicated by arrows I, aerodynamic performance can be improved, and fuel consumption performance can be improved.

The following is a description, made with reference to FIGS. 15 and 16, of an example of a shock load acting on the spare tire 25 from the rear of the vehicle body.

Figure 15A:
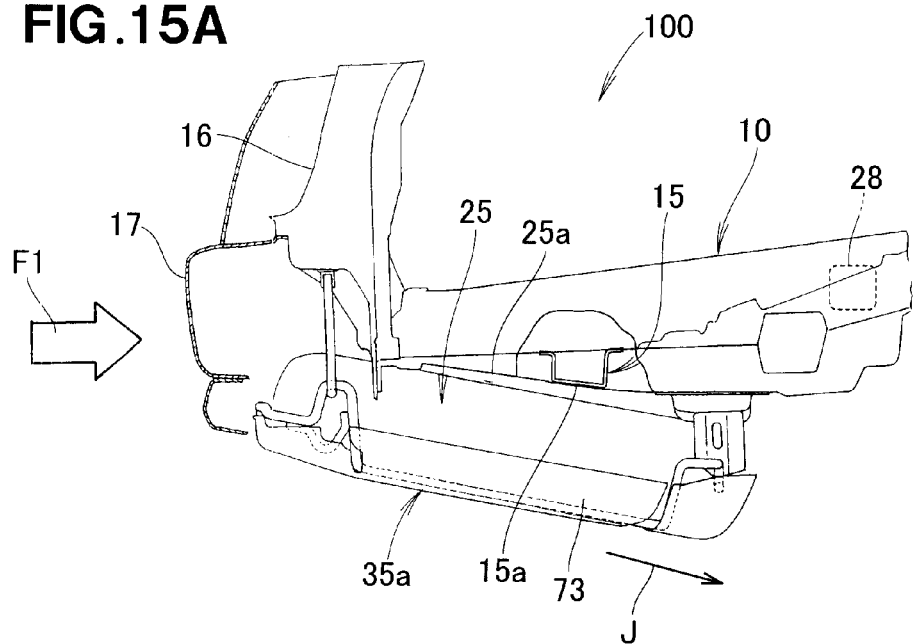
FIGS. 15A and 15B are schematic views showing a state in which a shock load has acted on the spare tire carrier from the rear of the vehicle body.

For example, a shock load F1 acts on the spare tire 25 from the rear of the vehicle 100 while the vehicle 100 is traveling, as shown in FIG. 15A.

The member bottom part 15a of the rear cross member 15 herein is formed at an incline having an inclination angle θ1 (FIG. 2) along the top part 25a of the spare tire 25.

Consequently, when the shock load F1 acts on the spare tire 25, the spare tire 25 can be guided by the member bottom part 15a at a downward slope toward the front of the vehicle body, as indicated by arrow J.

The spare tire 25 can thereby be prevented from interfering with the fuel system (e.g., the canister 28 and other components) provided in proximity to the rear floor 13, and it is possible to ensure that the fuel system (e.g., the canister 28 and other components) will not be affected.

Figure 15B:
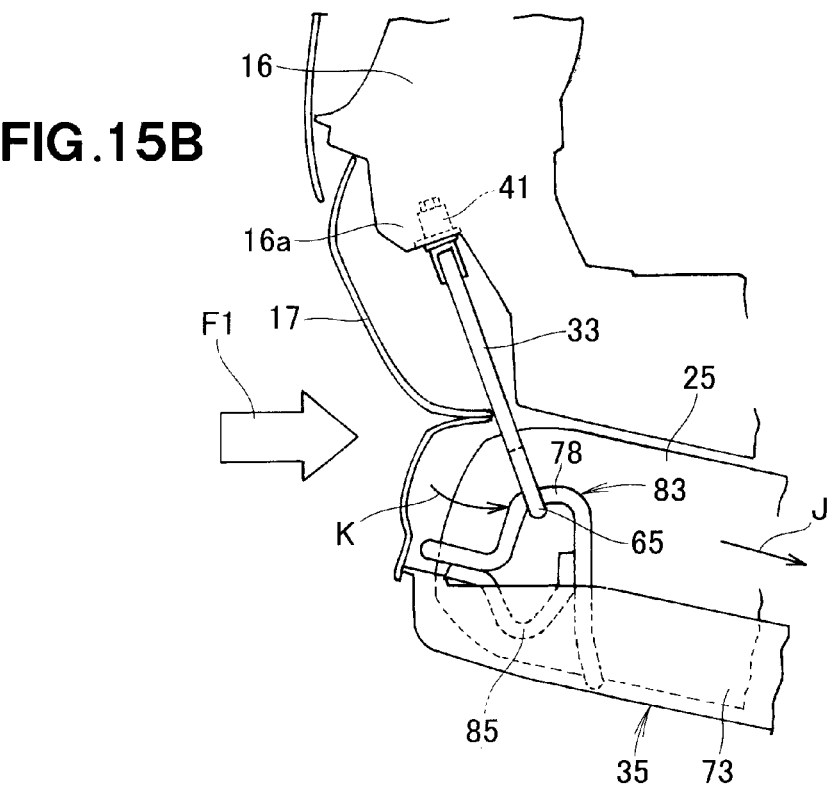

The spare tire 25 moves as indicated by arrow J, whereby the annular rear connecting part 83 also moves as indicated by arrow J as shown in FIG. 15B. The annular rear connecting part 83 is latched to (engaged with) to the hook 65.

Consequently, the movement of the right substantially V-shaped frame 82 causes the rear support part 33 to swingably move about the support boss 41 as a fulcrum, as indicated by arrow K.

Figure 16A:
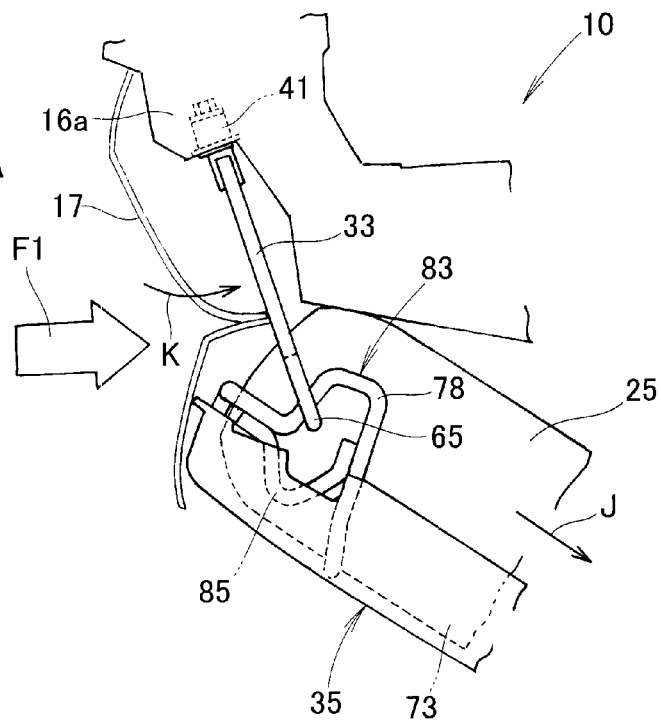
FIGS. 16 and 16B are schematic views showing the spare tire carrier with a bottom front cover thereof being grounded on a road surface.

The rear connecting part 83 is formed into an annular shape by the lower half annular part 85 and the upper half annular part 78 as shown in FIG. 16A.

Consequently, when the annular rear connecting part 83 has moved as indicated by arrow J and the rear support part 33 has swingably moved as indicated by arrow K, there is no danger of the annular rear connecting part 83 detaching (separating) from the hook 65.

Consequently, the annular rear connecting part 83 can be preserved in its state of being latched to (engaged with) the hook 65.

The spare tire 25 can thereby be prevented from falling off of the vehicle body rear part structure 10 (i.e., the spare tire carrier 35).

Figure 16B:
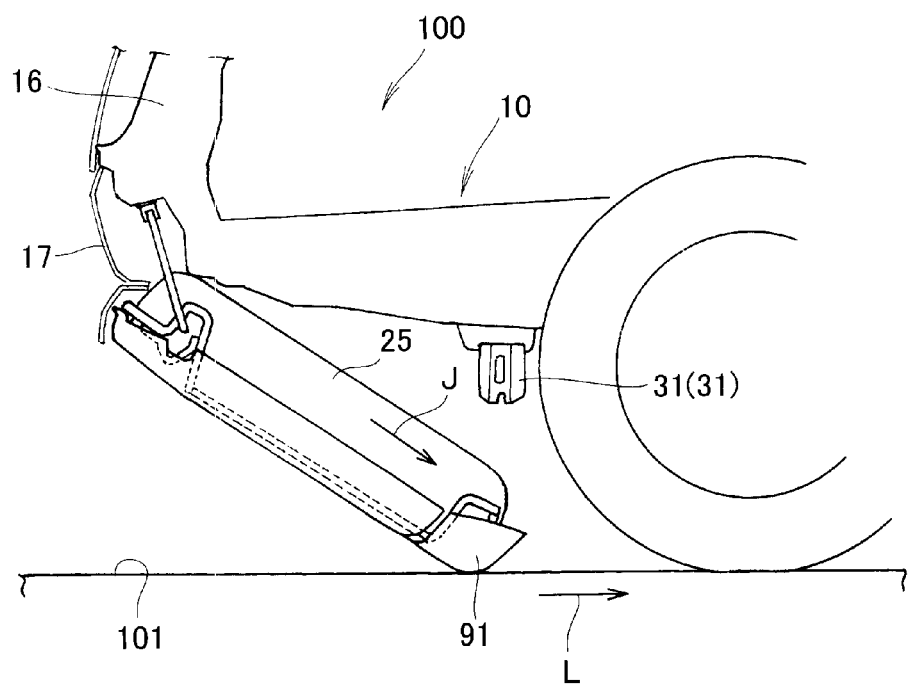

The spare tire 25 moving as indicated by arrow J causes the bottom front cover 91 to come in contact with the road surface 101 (the ground) as shown in FIG. 16B. The bottom front cover 91 herein is a metal cover and is provided with rigidity.

Thus, using a metal cover for the bottom front cover 91 and increasing rigidity enables the bottom front cover 91 to slide along the road surface 101 as indicated by arrow L toward the front of the vehicle body together with the vehicle 100.

In other words, the bottom front part 25c of the spare tire 25 can be prevented from coming in contact with the road surface 101 (the ground), and the spare tire 25 can be prevented from bouncing back toward the rear of the vehicle body.

As a consequence thereof, it is possible to prevent situations in which the rear of the vehicle body (specifically, the rear floor) is affected by a bouncing spare tire 25.

(Second Embodiment)

Next, a spare tire carrier 110 according to the second embodiment will be described.

Figure 17:
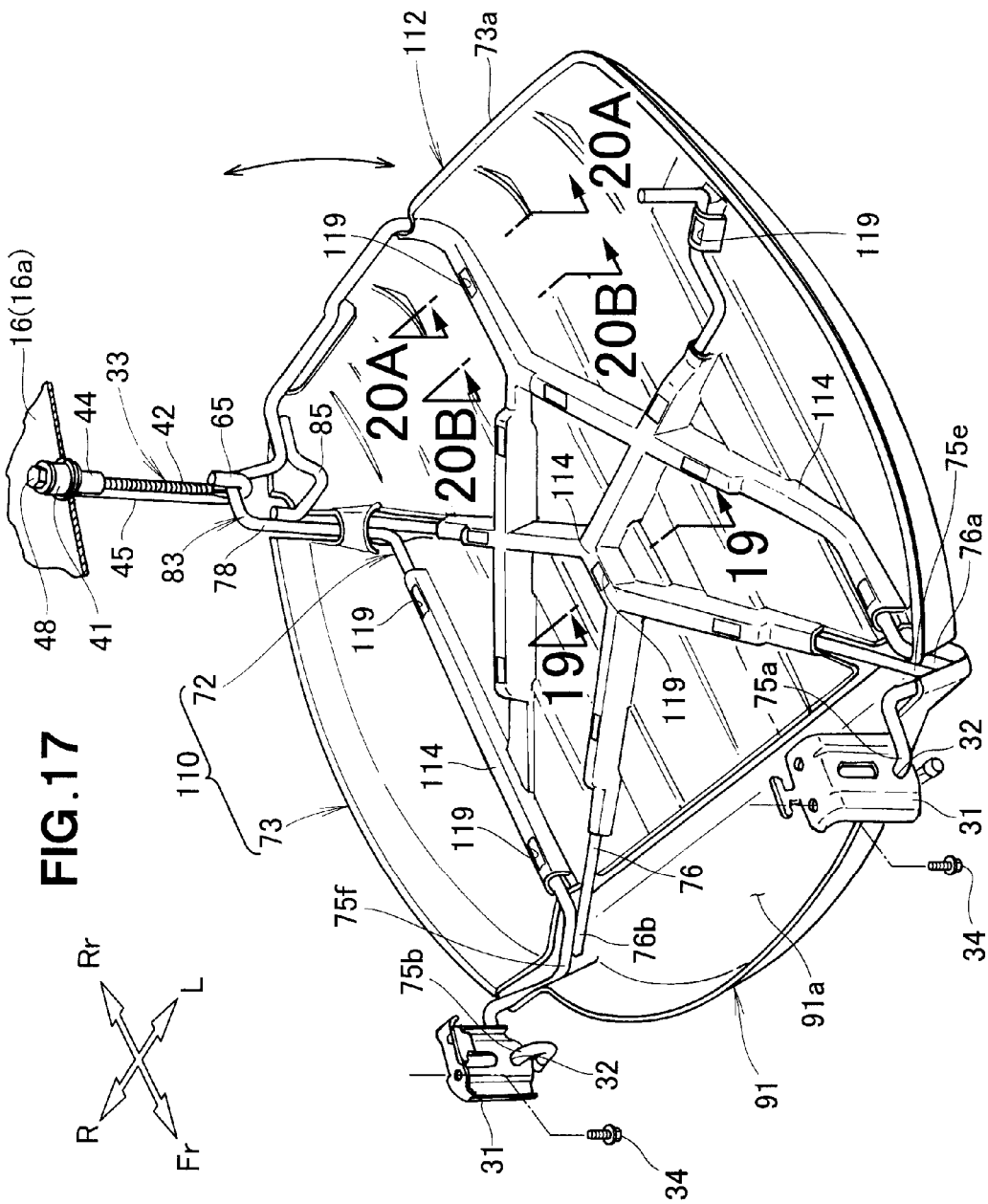
FIG. 17 is a perspective view illustrating a spare tire carrier according to a second embodiment of the present invention.

The spare tire carrier 110 according to the second embodiment is different in that the bottom rear cover 92 of the first embodiment is replaced by a bottom rear cover 112 as shown in FIG. 17, and the configuration is otherwise identical to the spare tire carrier 35 of the first embodiment.

Figure 18:
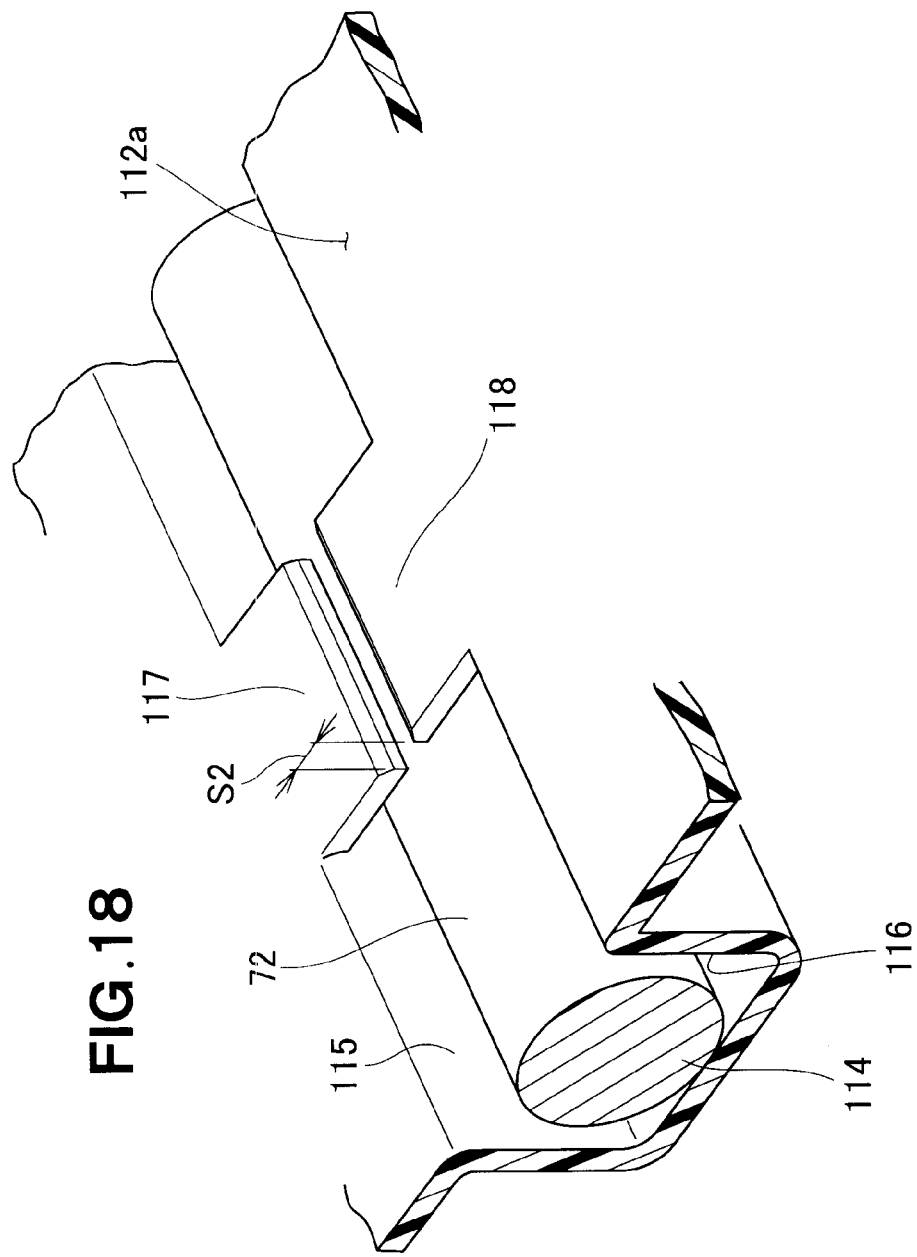
FIG. 18 is a perspective view showing partially in section the spare tire carrier of FIG. 17 as seen from underside.
Figure 19:
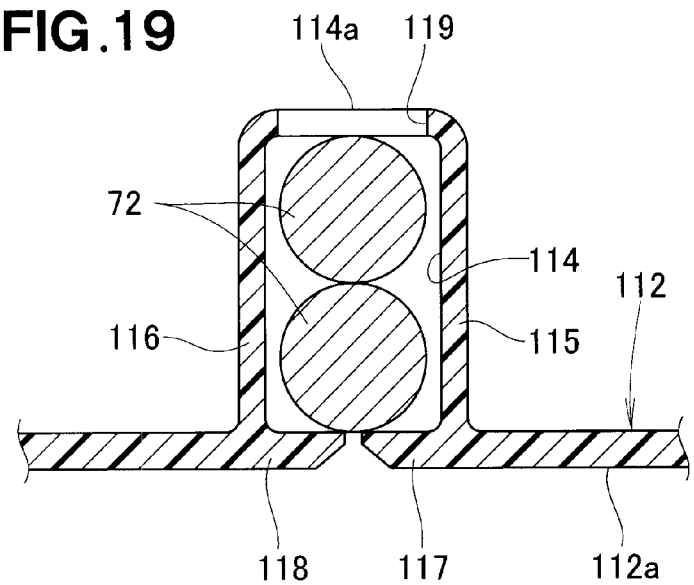
FIG. 19 is an enlarged cross-sectional view taken along line 19-19 of FIG. 17.
Figure 20A:
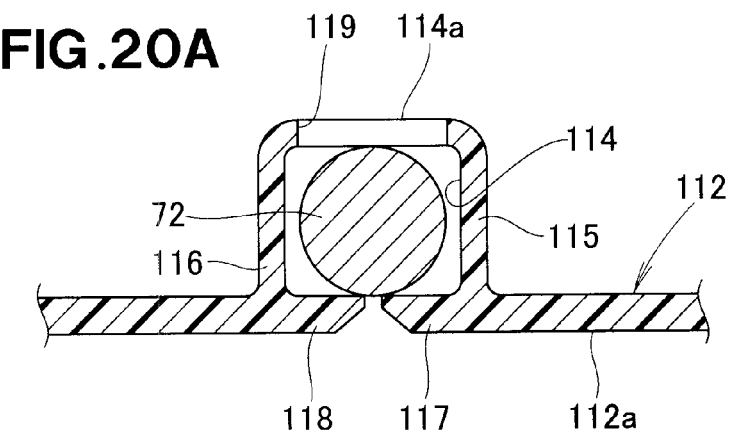
Figure 20B:
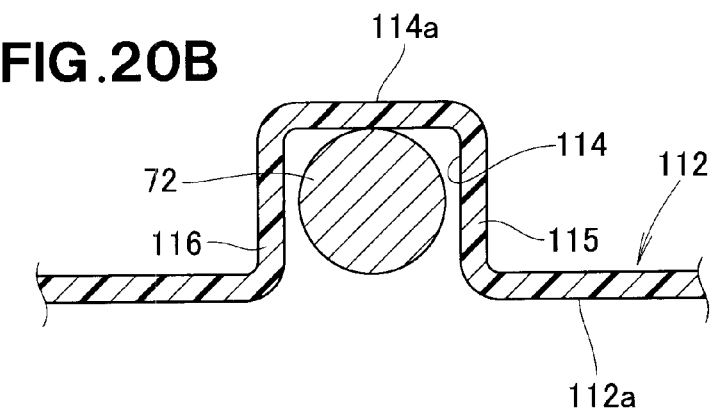
FIG. 20B is an enlarged cross-sectional view taken along line 20B-20B of FIG. 17.

In the bottom rear cover 112, an embedding groove (embedding concavity) 114 which concaves toward the inside of the bottom rear cover 112 is formed in the external surface 112a as shown in FIGS. 18 to 20, and the configuration is otherwise identical to the bottom rear cover 92 of the first embodiment.

The frame part 72 is fitted into the embedding groove 114 from the outside of the bottom rear cover 112.

One interlocking projection (an interlocking projection) 117 protrudes from one side wall (a side wall) 115 of the embedding groove 114 toward the other opposing side wall (a side wall) 116.

Another interlocking projection (an interlocking projection) 118 also protrudes from the other side wall (a side wall) 116 of the embedding groove 114 toward the opposing first side wall (a side wall) 115.

A plurality of openings 119 is formed in a bottom part 114a of the embedding groove 114 as shown in FIGS. 17 and 19 through 21.

The openings 119 are openings needed in order to receive the forming die when the first interlocking projection 117 and the second interlocking projection 118 are formed.

The first interlocking projection 117 and the second interlocking projection 118 are made to protrude (jut) so as to face each other across a predetermined gap S2.

Consequently, the frame part 72 is held inside the embedding groove 114 by the first interlocking projection 117 and the second interlocking projection 118, whereby the frame part 72 can be prevented from falling out.

The following is a description, made with reference to FIGS. 21A and 21B, of the procedure of embedding the frame part 72 in the embedding groove 114.

The frame part 72 is inserted into the embedding groove 114 as indicated by arrow M, as shown in FIG. 21A.

The frame part 72 comes in contact with the first interlocking projection 117 and the second interlocking projections 118, and the first interlocking projection 117 and second interlocking projection 118 elastically deform as indicated by arrows N.

The frame part 72 surmounts the first interlocking projection 117 and the second interlocking projection 118 and fits into the embedding groove 114 as shown in FIG. 21B.

The frame part 72 separates from the first interlocking projection 117 and the second interlocking projection 118, and the first interlocking projection 117 and second interlocking projection 118 return to their original state as indicated by arrows O.

The frame part 72 can thereby be held in a state of being embedded in the embedding groove 114 by the first interlocking projection 117 and the second interlocking projection 118.

The frame part 72 can thereby be easily embedded in the embedding groove 114 without excessive effort.

Furthermore, by holding the frame part 72 in the embedding groove 114 by the first interlocking projection 117 and the second interlocking projection 118, the frame part 72 can be prevented from falling out.

A holding-designated member is thereby not needed in order to hold the frame part 72 in the embedding groove 114, and the number of components can be minimized.

For example, the mounting brackets 87, 88 and the rivets 89 (see FIG. 9) were needed as holding-designated members in the first embodiment, but these members can be omitted.

It is accordingly possible to lower the cost, reduce the number of assembly steps, and lessen the weight.

Additionally, with the spare tire carrier 110 of the second embodiment, the same effects can be obtained as with the spare tire carrier 35 of the first embodiment.

The vehicle body rear part structure 10 according to the present invention is not limited to the first and second embodiments previously described, and can be changed improved, or otherwise modified as is appropriate.

For example, in the first and second embodiments, examples are given in which the rear support part 33 was mounted to the right end 16a of the rear panel 16 and the annular rear connecting part 83 was provided to the right rear end of the frame part 72, but the present invention is not limited to these examples, and other possibilities include providing the rear support part 33 and the annular rear connecting part 83 to the left side or providing them to both the left and right sides.

The shapes and configurations of the rear floor 13, the spare tire 25, the left and right front support parts 31, the rear support part 33, the spare tire carrier 35, the frame part 72, the tire cover 73, the external surface 73c of the tire cover, the left front connecting part 75a, the right front connecting part 75b, the annular rear connecting part 83, the metal bottom front cover 91, the bottom rear cover 92 made of a resin, the embedding grooves 94 and 114, the first side wall 115, the second side wall 116, the first interlocking projection 117, the second interlocking projection 118, and other components shown in the first and second embodiments are not limited to those given by way of example and can be changed as is appropriate.

The vehicle body rear part structure of the present invention is suitable for application in an automobile in which a steel frame is provided underneath a rear floor, and a spare tire carrier is provided for storing a spare tire using the frame.

Obviously, various minor changes and modifications of the present invention are possible in light of the above teaching. It is therefore to be understood that within the scope of the appended claims the invention may be practiced otherwise than as specifically described.

What is claimed is:

1. A rear part structure of a vehicle body, comprising:
   a spare tire carrier that includes
      a steel frame part that is provided underneath a rear floor of the vehicle body via front and rear support parts, wherein the spare tire carrier stores a spare tire; and
      a tire cover that is disposed on the frame part and covers a bottom part of the spare tire, the tire cover including an external surface that faces away from the spare tire, the tire cover defining an embedding groove that is recessed from the external surface toward the spare tire,
   wherein the frame part is completely received within the embedding groove so as to not protrude from the external surface of the tire cover,
   wherein the frame part includes a substantially U-shaped main frame formed of a steel rod, and an X-frame formed of a steel rod and joined to an inside of the substantially U-shaped main frame to reinforce the main frame, and opposite end parts of the substantially U-shaped main frame form front connecting parts that are rotatably connected to support holes formed in the front support parts, and a rear connecting part that is vertically movably connected to the rear support part, so that vertical movements of the rear connecting part via the rear support part place the spare tire carrier in a tire storage position in which the spare tire is stored in position, and a tire access position in which the spare tire is capable of being accessed,
   wherein the tire cover comprises: a metallic bottom front cover part that covers a bottom front part of the spare tire; and a resinous bottom rear cover part disposed rearwardly from the bottom front cover part in a direction of the vehicle body, the bottom rear cover part covers a region of the spare tire extending from a position rearward of the bottom front part of the spare tire to a bottom rear part of the spare tire, and
   wherein the frame part is formed of a round steel rod, the embedding groove is defined by opposed side walls, each side wall having an interlocking projection protruding toward an interlocking projection of a companion side wall, the interlocking projections being elastically deformable to accept entry of the frame part into the embedding groove when the frame part is forced into the embedding groove, and the frame part is held in the embedding groove by the interlocking projections whereby the frame part is prevented from falling out, the embedding groove being defined in the resinous bottom rear cover part and the interlocking projections being part of the resinous bottom rear cover part.

2. The rear part structure of claim 1, wherein the tire cover is downwardly inclined toward a front end of the vehicle body.

3. The rear part structure of claim 1, wherein the frame part comprises:
   front connecting parts that are rotatably connected to the front support parts; and
   an annular rear connecting part that is latched to a hook of the rear support part, wherein the hook is vertically movably provided to the rear support part so that vertical movements of the hook via the rear support part moves the annular rear connecting part between the tire storage position and the tire access position.

4. The rear part structure of claim 1, further comprising right and left rear side frames extending in a longitudinal direction of the vehicle body, and a cross member spanning between the right and left rear side frames and extending below the rear floor and above the spare tire in a width direction of the vehicle body, wherein the cross member has a bottom part inclined downwardly forwardly of the vehicle body, so that when a shock load is exerted on the spare tire from rearward of the vehicle body, the spare tire is guided downwardly forwardly of the vehicle body by the inclined bottom part of the cross member.

5. The rear part structure of claim 1, wherein the rear support part comprises a cylindrical part with an internal thread formed in an internal peripheral surface thereof, and a shaft provided with an external thread that threadedly engages the internal thread of the cylindrical part, the cylindrical part movable along the shaft by rotation of the shaft,
   the shaft has a stopper part at an end part thereof, the stopper part being provided with interlocking projections that interlock with a concave part formed on an external peripheral surface of the end part, and
   the interlocking projections have external inclined parts formed to provide parts tapering in cross section, the tapering parts being in fitted engagement with an internal peripheral surface of the cylindrical part, an end part of the cylindrical part that comes in contact with the inclined parts to thereby prevent the cylindrical part from moving.

6. The rear part structure of claim 5, wherein the cylindrical part has a hook that suspends the spare tire carrier so that the spare tire held in the spare tire carrier is stored below the rear floor via the hook.

7. The rear part structure of claim 5, wherein the stopper part has a protector part that protects the end part of the shaft.

8. A rear part structure of a vehicle body, comprising:
a spare tire carrier which is comprised of
a steel frame part, provided underneath a rear floor via front and rear support parts, for storing a spare tire; and
a tire cover, provided on the frame part, for covering a bottom part of the spare tire, wherein the tire cover has on an external surface an embedding groove recessed toward inside the tire cover,
the frame part being embedded in the embedding groove from outside the tire cover to thereby provide the tire cover to the frame part, and
the frame part has front connecting parts rotatably connected to the front support parts, and a rear connecting part vertically movably connected to the rear support part, so that vertical movements of the rear connecting part via the rear support part place the spare tire carrier in a tire storage position in which the spare tire is stored in position, and a tire access position in which the spare tire is capable of being accessed,
the rear floor has a ledge at a substantially central position thereof, the ledge being bulged downward and having a floor bottom part formed so as to slope downward toward a front of the vehicle body from a vicinity of a rear panel of the vehicle body,
wherein the spare tire is supported by the spare tire carrier in a forward-inclined state having an inclination angle toward the front of the vehicle body such that a top part of the spare tire extends below the floor bottom part of the ledge,
the tire cover has a rear end disposed at a substantially same height as a bottom part of a rear bumper, and the tire cover is inclined in a forward incline having an inclination angle toward the front of the vehicle body so that a height of a front end of the tire cover is lower than the bottom part of the rear bumper,
wherein the tire cover comprises: a metallic bottom front cover part that covers a bottom front part of the spare tire; and a resinous bottom rear cover part disposed rearwardly from the bottom front cover part in a direction of the vehicle body, the bottom rear cover part covers a region of the spare tire extending from a position rearward of the bottom front part of the spare tire to a bottom rear part of the spare tire, and
the frame part is formed from a round steel rod, the embedding groove is defined by opposed side walls, each side wall having an interlocking projection protruding toward an interlocking projection of a companion side wall, the interlocking projections being elastically deformable to accept entry of the frame part into the embedding groove when the frame part is forced into the embedding groove, and the frame part is held in the embedding groove by the interlocking projections whereby the frame part is prevented from falling out, the embedding groove being defined in the resinous bottom rear cover part and the interlocking projections being part of the resinous bottom rear cover part.

9. The rear part structure of claim 8, wherein the frame part comprises:
front connecting parts that are rotatably connected to the front support parts; and
an annular rear connecting part that is latched to a hook of the rear support part, wherein the hook is vertically movably provided to the rear support part so that vertical movements of the hook via the rear support part moves the annular rear connecting part between the tire storage position and the tire access position.

10. The rear part structure of claim 8, further comprising right and left rear side frames extending in a longitudinal direction of the vehicle body, and a cross member spanning between the right and left rear side frames and extending below the rear floor and above the spare tire in a width direction of the vehicle body, wherein the cross member has a bottom part inclined downwardly forwardly of the vehicle body, so that when a shock load is exerted on the spare tire from rearward of the vehicle body, the spare tire is guided downwardly forwardly of the vehicle body by the inclined bottom part of the cross member.

11. The rear part structure of claim 8, wherein the rear support part comprises a cylindrical part with an internal thread formed in an internal peripheral surface thereof, and a shaft provided with an external thread that threadedly engages the internal thread of the cylindrical part, the cylindrical part movable along the shaft by rotation of the shaft,
the shaft has a stopper part at an end part thereof, the stopper part being provided with interlocking projections that interlock with a concave part formed on an external peripheral surface of the end part, and
the interlocking projections have external inclined parts formed to provide parts tapering in cross section, the tapering parts being in fitted engagement with an internal peripheral surface of the cylindrical part, an end part of the cylindrical part that comes in contact with the inclined parts to thereby prevent the cylindrical part from moving.

12. The rear part structure of claim 11, wherein the cylindrical part has a hook that suspends the spare tire carrier so that the spare tire held in the spare tire carrier is stored below the rear floor via the hook.

13. The rear part structure of claim 11, wherein the stopper part has a protector part that protects the end part of the shaft.

14. The rear part structure of claim 1, wherein among the metallic bottom front cover part of the tire cover and the resinous bottom rear cover part of the tire cover, the embedding groove is defined only in the resinous bottom rear cover part of the tire cover.

15. The rear part structure of claim 1, wherein the tire cover covers a bottom front region of the spare tire and a bottom rear region of the spare tire, the bottom front region of the spare tire includes the bottom front part of the spare tire and the bottom rear region of the spare tire includes the bottom rear part of the spare tire, and
among the bottom front region of the spare tire and the bottom rear region of the spare tire, the metallic bottom front cover part covers only the bottom front region of the spare tire, and the resinous bottom rear cover part covers only the bottom rear region of the spare tire.

16. The rear part structure of claim 1, wherein each of the interlocking projections extend across a portion of a gap between the opposed side walls that define the embedding groove, each of the interlocking projections include an inner end spaced from the side wall and facing the inner end of the interlocking projection of the companion side wall, and the inner ends of the interlocking projections are beveled at an external surface thereof.

17. The rear part structure of claim 8, wherein among the metallic bottom front cover part of the tire cover and the resinous bottom rear cover part of the tire cover, the embedding groove is defined only in the resinous bottom rear cover part of the tire cover.

18. The rear part structure of claim 8, wherein the tire cover covers a bottom front region of the spare tire and a bottom rear region of the spare tire, the bottom front region of the spare tire includes the bottom front part of the spare tire and the bottom rear region of the spare tire includes the bottom rear part of the spare tire, and among the bottom front region of the spare tire and the bottom rear region of the spare tire, the metallic bottom front cover part covers only the bottom front region of the spare tire, and the resinous bottom rear cover part covers only the bottom rear region of the spare tire.

19. The rear part structure of claim 8, wherein each of the interlocking projections extend across a portion of a gap between the opposed side walls that define the embedding groove, each of the interlocking projections include an inner end spaced from the side wall and facing the inner end of the interlocking projection of the companion side wall, and the inner ends of the interlocking projections are beveled at an external surface thereof.

* * * * *